United States Patent
White et al.

(10) Patent No.: US 11,689,142 B2
(45) Date of Patent: Jun. 27, 2023

(54) INVERTER FOR CONTROLLING AN ELECTRIC MACHINE WITHOUT PRIOR CHARACTERIZATION

(71) Applicant: Deere & Company, Moline, IL (US)

(72) Inventors: Lauren M. White, Fargo, ND (US); Long Wu, Fargo, ND (US); Lav Thyagarajan, Fargo, ND (US); Danielle Li, Fargo, ND (US); Scott C. Johnson, Fargo, ND (US)

(73) Assignee: Deere & Company, Moline, IL (US)

( * ) Notice: Subject to any disclaimer, the term of this patent is extended or adjusted under 35 U.S.C. 154(b) by 43 days.

(21) Appl. No.: 17/643,831

(22) Filed: Dec. 12, 2021

(65) Prior Publication Data

US 2022/0376642 A1 Nov. 24, 2022

Related U.S. Application Data

(60) Provisional application No. 63/201,963, filed on May 20, 2021.

(51) Int. Cl.
*H02P 27/08* (2006.01)
*H02P 23/14* (2006.01)

(52) U.S. Cl.
CPC ............. *H02P 27/08* (2013.01); *H02P 23/14* (2013.01)

(58) Field of Classification Search
CPC .. H02P 21/00; H02P 21/0003; H02P 21/0089; H02P 21/06; H02P 21/12;
(Continued)

(56) References Cited

U.S. PATENT DOCUMENTS 4,585,985 A 4/1986 Bose
5,689,169 A 11/1997 Kerkman et al.
(Continued)

FOREIGN PATENT DOCUMENTS

| CN | 107294451 A | 10/2017 |
| EP | 2464002 A1 | 6/2012 |
| EP | 3570429 A1 | 11/2019 |

OTHER PUBLICATIONS

Extended European Search Report and Written Opinion issued in European Patent Application No. 22170925.6, dated Oct. 24, 2022, in 12 pages.
(Continued)

*Primary Examiner* — Antony M Paul

(57) ABSTRACT

A control module comprises software instructions for execution by an electronic data processor. An inductance estimator is configured to estimate direct inductance and quadrature inductance associated with the electric machine based on a first set of equations that assume constant rotor resistance and constant magnetic flux. A torque estimator is configured to estimate an observed torque associated with a rotor of the electric machine based a commanded direct-axis voltage and a commanded quadrature-axis voltage, where the observed torque is proportional to the observed power consumption of the electric machine. A pulse-width-modulation (PWM) module is configured to provide pulse-width modulated signals to the electric machine based on the commanded direct-axis voltage and a commanded quadrature-axis voltage. A back-electromotive force adjustment is derived from an estimated, observed torque and a commanded torque.

16 Claims, 10 Drawing Sheets

(58) Field of Classification Search
CPC .......... H02P 21/14; H02P 21/20; H02P 21/22;
H02P 21/26; H02P 21/28; H02P 21/30;
H02P 23/00; H02P 23/009; H02P 23/07;
H02P 23/12; H02P 23/14; H02P 23/30;
H02P 27/00; H02P 27/04; H02P 27/06;
H02P 27/08; H02P 25/00; H02P 6/00;
H02P 6/04; H02P 6/08; H02P 6/157;
H02P 6/182; H02P 6/185; H02P 6/28;
H02P 6/32; H02P 7/29; H02P 1/00; H02P
1/24; H02P 1/26; H02P 1/42; H02P 1/46
See application file for complete search history.

(56) References Cited

U.S. PATENT DOCUMENTS

| | | |
|---|---|---|
| 6,288,515 B1 | 9/2001 | Hiti et al. |
| 7,586,286 B2 * | 9/2009 | Cheng .................. H02P 23/30 318/815 |
| 8,786,230 B2 | 7/2014 | Lee et al. |
| 9,634,593 B2 | 4/2017 | Marcinkiewicz et al. |
| 2008/0116842 A1 | 5/2008 | Cheng et al. |

OTHER PUBLICATIONS

Dong-Youn Kim et al: "Sensorless control method of 3-Phase BLDC motor through the real time compensation of back-EMF constant", 2016 IEEE 8th International Power Electronics and Motion Control Conference (IPEMC-ECCE Asia), IEEE, May 22, 2016, pp. 3361-3367, DOI:10.1109/IPEMC.2016.7512834.

Salomaki J et al: "Influence of Inverter Output Filter on Maximum Torque and Speed of PMSM Drives", Fourth Power Conversion Conference, Apr. 2-5, 2007, Nagoya, Japan, IEEE, Piscataway, NJ, USA, Apr. 1, 2007, pp. 852-859, DOI: 10.1109/PCCON.2007.373066 ISBN: 978-1-4244-0843-6.

Reddy V Vinay Kumar et al: "MTPA/MTPF Control of Interior Permanent Magnet Synchronous Machine by Estimating Inductances", 2019 International Conference on Power Electronics Applications and Technology in Present Energy Scenario (PETPES), IEEE, Aug. 29, 2019, pp. 1-6, DOI: 10.1109/PETPES47060.2019.9004034.

Francesco Parasiliti et al: "Finite-Element-Based Multiobjective Design Optimization Procedure of Interior Permanent Magnet Synchronous Motors for Wide Constant-Power Region Operation", IEEE Transactions on Industrial Electronics, IEEE Service Center, Piscataway, NJ, USA, vol. 59, No. 6, Jun. 1, 2012, pp. 2503-2514, ISSN: 0278-0046, DOI: 10.1109/TIE.2011.2171174.

* cited by examiner

US 11,689,142 B2

INVERTER FOR CONTROLLING AN ELECTRIC MACHINE WITHOUT PRIOR CHARACTERIZATION

RELATED APPLICATION

This document (including the drawings) claims priority and the benefit of the filing date based on U.S. provisional application No. 63/201,963, filed May 20, 2021, and entitled INVERTER FOR CONTROLLING AN ELECTRIC MACHINE WITHOUT PRIOR CHARACTERIZATION under 35 U.S.C. § 119(e), where the provisional application is hereby incorporated by reference herein.

FIELD OF DISCLOSURE

This disclosure relates to an inverter for controlling an electric machine without prior characterization of the electric machine.

BACKGROUND ART

In some prior art, an inverter and electric machine are tested or commissioned as a matched pair in a lab prior to installation into equipment. During the lab testing, the electric machine is characterized by generating one or more corresponding look-up tables associated with the electric machine to control properly the electric machine in compatible manner. First, the lab testing introduces possible additional labor costs into the combination of the inverter and electric machine. Second, the lab testing may limit the available electric machines, or the universe of compatible electric machines, for a corresponding inverter only to those pairs of inverters and electric machines that have been tested and characterized. According, there is a need for an inverter for controlling an electric machine without prior characterization.

SUMMARY

In accordance with one embodiment, upon electrically connecting an electric machine to a controller, the inverter operates based on initial electric machine parameters (e.g., default machine parameters) that are read or retrieved from a data storage device. During operation of the electric machine based on the initial electric machine parameters, an inductance estimator of the controller is configured to estimate an estimated direct inductance and an estimated quadrature inductance associated with the electric machine (e.g., without prior characterization, commissioning or testing to establish any reference parameters or look-up tables related to the electric machine) based on a first set of equations that assume (e.g., a default or initial) rotor resistance and (e.g., a default or initial) magnetic flux (or a combination of (e.g., default or initial) back emf constant and number pole pairs). Further, the inverter (e.g., or the inductance estimation module) estimates the estimated direct inductance and estimated quadrature inductance to be consistent with an operational point or region of the maximum torque per amp curve, a field weakening region, or both based on respective commanded direct-axis voltage (or current) and a commanded quadrature-axis voltage (or current).

In accordance with another aspect of the disclosure, a torque estimator is configured to estimate an observed torque measurement associated with a rotor of the electric machine based on measured direct-axis current at the electric machine terminals, measured quadrature-axis current at the electric machine terminals, estimated electrical rotor speed, the respective commanded direct-axis voltage (or current) and a commanded quadrature-axis voltage (or current) that are associated with a commanded torque, where the observed torque measurement is generally proportional to the observed power consumption of the electric machine.

In accordance with yet another aspect of the disclosure, first, a controller (e.g., proportional integral control) determines a commanded quadrature-axis current based on a commanded torque. Second, the electronic data processor, or the torque-to-current controller, alone or together with equation-based control module, estimates the corresponding commanded direct-axis current to the commanded quadrature-axis current: (a) to be consistent with an operational point or operational region of the maximum torque per amp curve and/or a field weakening region based on respective commanded direct-axis voltage (or current) and a commanded quadrature-axis voltage (or current) and (b) based on the estimated direct inductance and estimated quadrature inductance.

In accordance with still another aspect of the disclosure, a pulse-width-modulation (PWM) module is configured to provide pulse-width modulated signals (e.g., for each phase) to the electric machine based on the commanded direct-axis voltage and a commanded quadrature-axis voltage. Further, a back-electromotive force constant is derived from an estimated, observed torque and a commanded torque (e.g., or with respect to the commanded direct-axis voltage and the commanded quadrature-axis voltage that represents the commanded torque) to estimate any potential adjustment to the back EMF constant.

DETAILED DESCRIPTION

Figure 1:
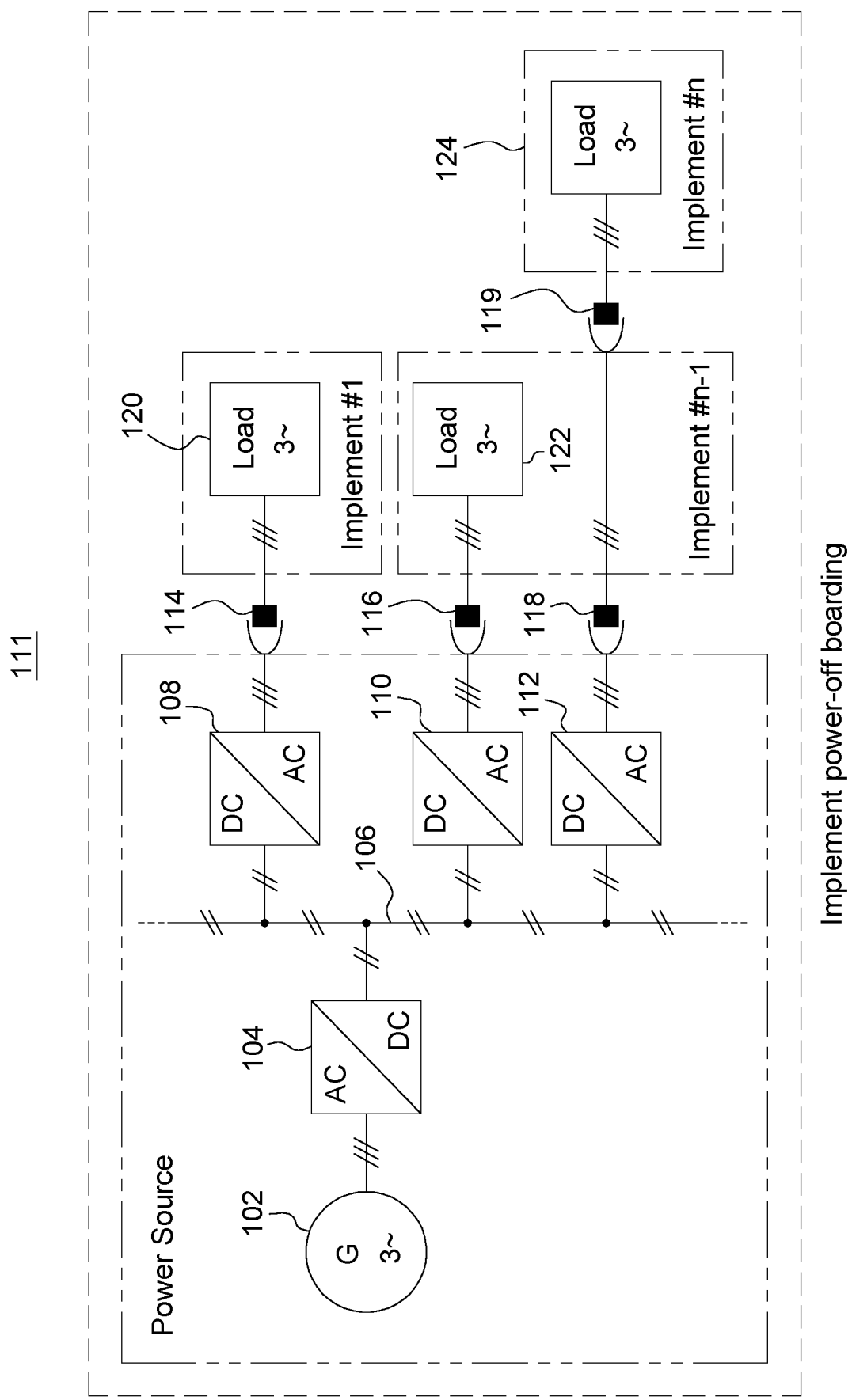
FIG. 1 is a block diagram of one illustrative embodiment of an electrical control system for a vehicle in which implement loads (e.g., electric machines or alternating current electric motors) can be coupled or decoupled to the vehicle.

As used in this document, adapted to, arranged to or configured to means that one or more data processors, logic devices, digital electronic circuits, delay lines, or electronic devices are programmed with software instructions to be executed, or are provided with equivalent circuitry, to perform a task, calculation, estimation, communication, or other function set forth in this document.

An electronic data processor means a microcontroller, microprocessor, an arithmetic logic unit, a Boolean logic circuit, a digital signal processor (DSP), a programmable gate array, an application specific integrated circuit (ASIC), or another electronic data processor for executing software instructions, logic, code or modules that are storable in any data storage device.

In any of the equations referenced throughout this document and appended claims, the terms are defined as follows, where an asterisk (*) can modify the below current and voltages to mean commanded voltages and an torque to mean commanded torque:

MTPA means Maximum torque per amp or ampere;
FW means field weakening;
LPF means low-pass filter;
fbw or $f_{bw}$ means the bandwidth of LPF, such as the −3 dB bandwidth or bandwidth measured at −3 dB below peak amplitude bandwidth;
Ld or $L_d$ means d-axis (direct-axis) inductance;
Lq or $L_q$ means q-axis (quadrature-axis) inductance;
Id or $I_d$ means d-axis (direct-axis) current;
Iq or $I_q$ means q-axis (quadrature-axis) current (e.g., expressed in amps);
Id* or $I_d^*$ means commanded d-axis (direct-axis) current;
Iq* or $I_q^*$ means commanded q-axis (quadrature-axis) current;
Vd or $V_d$ means d-axis (direct-axis) voltage (e.g., expressed in volts);
Vq or $V_q$ means q-axis (quadrature-axis) voltage;
Vd* or $V_d^*$ means d-axis (direct-axis) voltage;
Vq* or $V_q^*$ means q-axis (quadrature-axis) voltage;
da or $d_a$ means the voltage at a first phase terminal of the electric machine (e.g., expressed in root mean square (RMS) volts);
db or $d_b$ means the voltage at a second phase terminal of the electric machine;
dc or $d_c$ means the voltage at a third phase terminal of the electric machine;
Rs or $R_s$ means stator resistance (e.g., expressed in ohms);
p means the number of machine poles, whereas P means number of pole pairs;
λf or $\lambda_f$ means the back emf constant (e.g., expressed in amps);
futil or $f_{util}$ means the DC (direct current) bus utilization factor;
Vdc of Vdc means DC bus voltage (e.g., expressed in DC volts);
ωe or $\omega_e$ means electrical speed in radians per second (rad/s);
ωm or $\omega_m$ means mechanical speed in radians per second (rad/s);
T* means raw or initial commanded torque (e.g., expressed in Newton-meters);
Tfinal* or $T_{final}^*$ means final commanded torque;
Test means the estimated torque determined based on the operating point or operating region of the commanded direct-axis current and commanded quadrature-axis current in the direct-quadrature (d-q) axis plane;
Tem means the estimated measured torque observed at the electric machine terminals; and
err is an error between a commanded torque and an estimate torque.

FIG. 1 is a block diagram of one illustrative embodiment of an electrical control system 111 for a vehicle in which implement loads (e.g., electric machines or alternating current electric motors) can be coupled or decoupled to the vehicle electronics. An electrical control system 111 of the vehicle has a power source 102, such as an internal combustion engine that provides rotational energy to an electric machine, such as a generator or alternator. During operation, the alternator converts inputted rotational energy to alternating current electrical energy.

Within the power source 102, the alternator output terminals are coupled to an alternating-current (AC)-to-direct-current (DC) converter 104, which may be referred to as a rectifier. The AC-to-DC converter 104 (e.g., rectifier) and one or more inverters (108, 110, 112) are coupled to a vehicle direct current (DC) bus 106. Each inverter (108, 110, 112) can convert the DC bus voltage of the DC bus 106 to a corresponding alternating current output of one or more phases, which are available at connectors (114, 116, 118 and 119) as illustrated in FIG. 1.

Further, each inverter (108, 110, 112) may be configured or programmed to output a different or targeted: (a) alternating current (AC) output level, (b) root mean squared voltage, or (c) peak-to-peak voltage that is matched or compatible with a removable load that may be connected or disconnected (e.g., independently, separately or collectively) from each respective inverter (108, 110, 112).

Although three inverters (108, 110, 112) and three corresponding loads (120, 122, 124) are illustrated in FIG. 1, it is understood that virtually any number of inverters (108, 110, 112) and loads (e.g., m inverters and corresponding n loads respectively, where m and n are any positive whole numbers) can be supported by one or more DC buses, subject to the typical current capacity or other pragmatic engineering design limitations of the DC bus. As illustrated the first inverter 108 is removably coupled to a respective first load 120 via corresponding first connector 114; the second inverter 110 is removably coupled to a respective second load 122 via corresponding second connector 116; and the third inverter 112 is removably coupled to a respective third load 124 via a corresponding third connector 118 and fourth connector 119. For example, each inverter (108, 110, 112) and its corresponding load (120, 122, 124), such as electric machine (e.g., alternating current motor) of an implement for a agricultural vehicle, a construction vehicle, heavy-equipment, lawn or turf care equipment, mining equipment, road maintenance, resurfacing or repair equipment, or another work vehicle, is connected by a connector (114, 116, 118, 119), which may comprise a combination of a plug and socket, which configuration may adhere to ISO or other standards in practice.

Figure 2A:
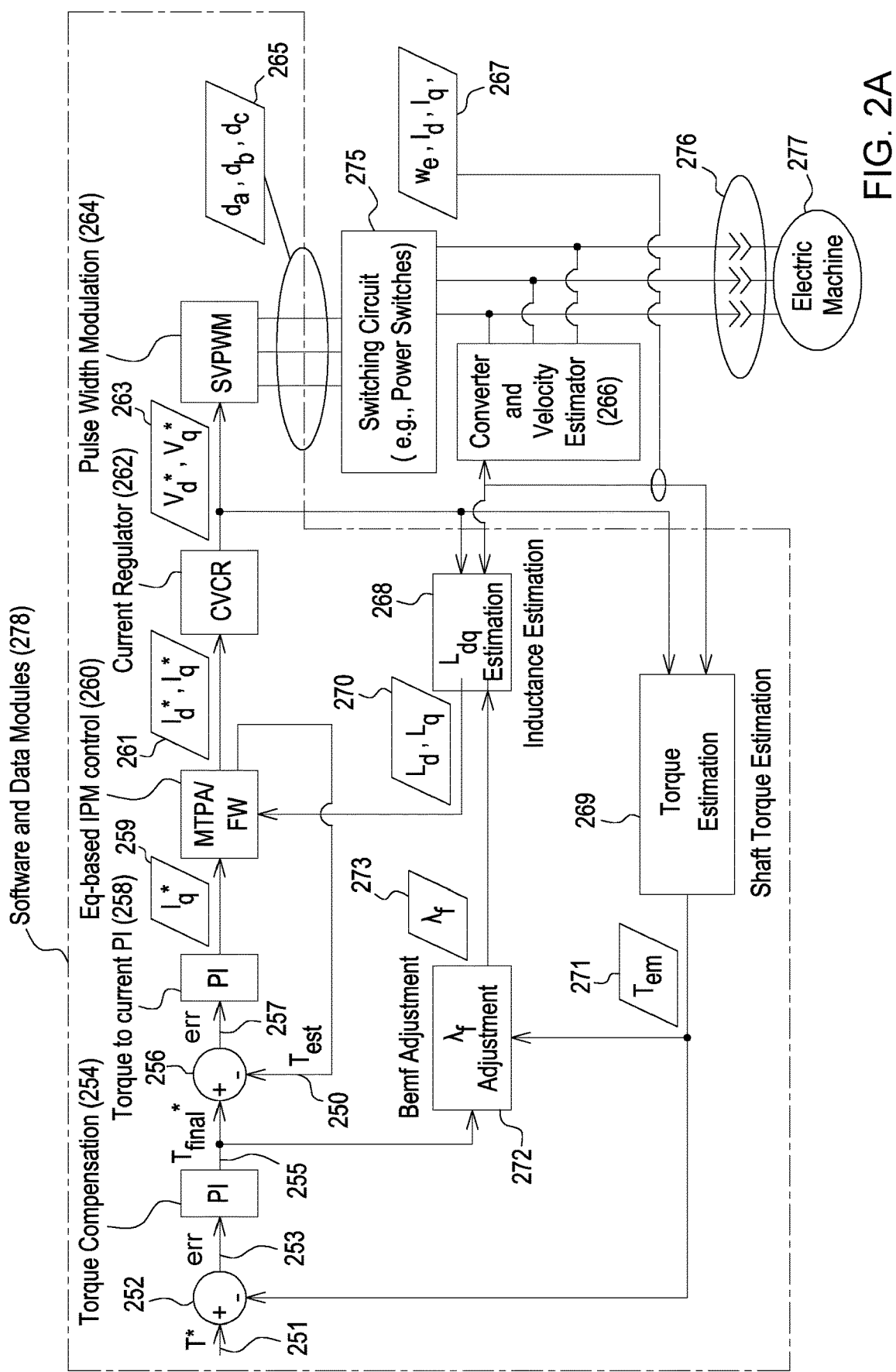
FIG. 2A is block diagram of one embodiment of an inverter control system for controlling an electric machine coupled to the inverter control system.

FIG. 2A illustrates a block diagram of one embodiment of an inverter control system or its software and data modules 278. In FIG. 2A, each block may represent a module. Each module may comprise software instructions, electronic hardware, or both. For example, the electronic data processor 298 (of FIG. 2B) may execute the software instructions, software and data modules 278 that are stored, read, retrieved, or accessed in the data storage device 299 via a data bus 297 to control an electric machine 277 coupled to the inverter control system.

In one embodiment, a first summer 252 receives an input of commanded torque 251 (T*) and estimated torque 271 ($T_{em}$) and outputs a first torque error 253 signal or data message for a sampling interval. As used throughout this document, reference number 271 represents the observed estimated torque, or the estimated, measured torque 271 (e.g., outputted by the torque estimation module 269), which is generally based on measurements at the alternating current terminals (e.g., phase terminals) of the electric machine 277 (e.g., or in alternate configurations is based on a torque sensor associated with the rotor of the electric machine).

In one configuration, the first summer 252 is coupled to a torque compensation controller 254 controller (e.g., proportional integral controller or a proportional integral derivative (PID) controller). The torque compensation controller 254 controller receives the first torque error 253 signal (or data message) and the commanded torque 251 (T*) as inputs and determines the final commanded torque 255 ($T_{final}$*).

In one embodiment, the torque compensation controller 254 controller comprises a proportional integral controller. For example, the proportional integral controller can use feedback control in which one signal proportional to the error (e.g., first torque error 253 signal) is superimposed on a ramp obtained by integrating the corrected output (e.g., final commanded torque 255), where the integral correction increases in response to the magnitude of the error (e.g., first torque error 253 signal) and the time during which the error persists.

In contrast, in an alternate embodiment, the torque compensation controller 254 uses a proportional integral derivative (PID) controller. A PID provides a correction based on proportional control, integral control and derivative control terms, where proportional control of an output parameter (e.g., final commanded torque 255) is proportional to an error (e.g., first torque error 253 signal) and the derivative control adjusts or dampens the rate of change of the error correction. The output of the torque compensation controller 254 is capable of communication with a back-EMF adjustment module 272 and a second summer 256.

The second summer 256 receives an input of the final commanded torque 255 (Tfinal*) and an estimated torque 250 resulting from equation-based control of the electric machine 277, such as equation-based controller 260 (e.g., equation-based interior permanent magnet controller) that applies one or more of the following: (a) maximum torque per amp (MTPA) equations, and/or (b) field weakening (FW) equations. The second summer 256 outputs or provides a second torque error 257 signal based on a difference between the final commanded torque 255 and the estimated torque 250 (Test), which may comprise an equation-based estimated torque based on the MTPFA equations, FW equations, or both. The second summer 256 output is capable of communication to the torque-to-current controller 258.

In one configuration, the torque-to-current controller 258 determines a commanded quadrature-axis current 259 (Iq*) based on the inputted second torque error 257 signal, which is outputted form the second summer 256. The commanded quadrature-axis current 259 (Iq*) is applied to an equation-based control module 260. The equation-based control module 260 determines or estimates a commanded current, such as commanded direct-axis current 261 (Id*) for the corresponding commanded quadrature-axis current 259 (Iq*) based on an estimated direct-axis inductance (Ld) and an estimated quadrature-axis inductance (Lq) of a respective electric machine 277. Throughout this document, reference number 261 refers to: (a) commanded direct-axis current alone, or (b) the matched pair or combination (e.g., equation-determined combination from the equation based controller 260) of commanded direct-axis current and quadrature-axis current.

For example, the inductance estimation module 268 may estimate the estimated direct-axis inductance (Ld) and an estimated quadrature-axis inductance (Lq) of a respective electric machine 277 to be consistent with one or more of the following: (a) maximum torque per amp (MTPA) equations, and/or (b) field weakening (FW) equations. Accordingly, the inductance estimation module 268 is configured to provide the estimated inductances as inputs to the equation-based control module 260. Meanwhile, the equation-based control module 260 is capable of communicating estimated torque based on the commanded current (Id*, Iq*) to the second summer 256 and communicating the commanded current to the current regulator 262.

In one configuration, the inductance estimation module 268 is configured to calculate or determine inductances that are bounded or constrained as a percentage of the nominal, initial, preliminary machine inductances of the electric machine 277; moreover, the inverter 550 or data processor 298 is configured to use the calculated or determined inductances are if rotor speed and torque of the electric machine 277 is above a certain threshold to ensure that the current and voltage signals have an appropriate signal-to-noise ratio for accurate inductance calculation by the inductance estimation module 268.

The current regulator 262 determines a commanded direct-axis voltage (Vd*) and a commanded quadrature-axis voltage (Vq*) that is provided to one or more of the following: (1) pulse-width modulation module 264, (2) inductance estimation module 268 or inductance estimator, and (3) a torque estimation module or torque estimator 269. As shown in FIG. 2A, the current regulator 262 is capable of communication with, or coupled to, the pulse-width modulation module 264, such as a space-vector pulse-width modulation module.

In one embodiment, the pulse-width modulation module 264 drives a switching circuit 275, such as power electronics switches (e.g., power field effect transistors or insulated gate bipolar junction transistors), with control signals 265. As illustrated in FIG. 2A in conjunction with FIG. 2B, the first control signal (da) is associated with the first control terminals 293 of the first phase 279 of the switches (282, 283); the second control signal (db) is associated with the second control terminals 294 of the second phase 280 of the switches (282, 283); the third control signal (dc) is associated with the third control terminals 295 of the third phase 281 of the switches (282, 283).

In turn, the switching circuit 275 is coupled to an electric machine 277, such as a, interior permanent magnet, synchronous electric machine, or an alternating current electric motor or alternator. The electric machine 277 may have one or more phases that receive alternating current (e.g., sinusoidal control signals 265) with different phase offsets to each other. Further, the electric machine 277 may be associated with a resolver, an encoder or another sensor for sensing an angular position, speed, velocity or acceleration of the rotor shaft.

In an alternate embodiment, the electric machine 277 may be associated with voltage sensors or current sensors associated with each phase or conductor that is coupled between the switching circuit 275 or electric machine 277. As illustrated in FIG. 2A, the converter and velocity estimator 266:

(a) converts or transforms the observed three-phase current measurements (Ia, Ib, Ic) to equivalent d-q axis currents (Id, Iq) (e.g., as illustrated as data within rhomboid block 267); (b) converts or transforms the observed three-phase voltage measurements (Va, Vb, Vc) to equivalent d-q axis voltages (Vd, Vq); (c) estimates the rotor velocity or rotor speed (such as the electrical rotor speed or velocity, ωe, as illustrated as data within rhomboid block 267) of the rotor by determining angular position versus time of the rotor based on the observed three-phase current measurements (Ia, Ib, Ic) or observed three-phase voltage measurements (Va, Vb, Vc), transformed equivalents or electric machine parameters derived from such measurements or transformed equivalents.

For example, the converter and velocity estimator 266 may comprise one or more transformation modules that operate in accordance with the following features or processes. First, the estimator 266 may comprise a first transformation module (e.g., Clark transform module) that transforms the measured or observed three-phase currents or voltages into a two-axis, orthogonal stationary reference frame (e.g., $I_\alpha$, $I_\beta$).

Further, the estimator 266 may comprise a second transformation module (e.g., Park transform module). Second, following the Clark transformation, the Park transform module can transform the two-axis, orthogonal stationary reference frame into rotating reference frame, such as the observed direct-axis current ($I_d$) and observed quadrature-axis current ($I_q$).

Third, the estimator 266 makes available or communicates any of the following data to the inductance estimation module 268 and the torque estimation module 269: observed direct-axis current and observed quadrature-axis current, and electrical speed or electrical angular velocity of the rotor shaft of the electric machine 277

The inductance estimation module 268 is coupled to any of the following: (1) a resolver, encoder or sensor for sensing an angular position, speed, velocity or acceleration of the rotor shaft, (2) one or more current sensors or voltage sensors associated with the phase inputs between the switching circuit 275 and the electric machine 277, (3) a transformation module, such as a Clark transformation module cascaded with, or in series with, a Park transform module, and/or (4) the converter and velocity estimator 266.

In one embodiment, the inductance estimation module 268 is configured to receive any of the following: (1) a commanded direct-axis voltage (Vd*) from the current regulator 262, (2) a commanded quadrature-axis voltage (Vq*) from the current regulator 262, (3) a back EMF constant 273 from the back EMF adjustment module 272, or (4) adjustment to the back EMF constant 273 from the back EMF adjustment module 272. The inductance estimation module 268 provides an output to the equation-based controller 260.

The back EMF adjustment module 272 is configured to receive a final commanded torque 255 and an estimated torque 250. Meanwhile, the back EMF adjustment module 272 is configured to output a back EMF constant 273 or an adjustment to the back EMF adjustment module 272 based on the final commanded torque 255 and an estimated torque 250.

The torque estimation module 269 is configured to receive the commanded direct-axis voltage (Vd*) and commanded quadrature-axis voltage (Vq*) from the current regulator 262; the observed direct-axis current measurement (Id) and observed quadrature-axis current measurement (Iq) from the estimator 266 (or from sensors associated with the phase interconnections between the switching circuit 275 and the electric machine 277), and electrical speed or electrical angular velocity of the rotor shaft of the electric machine 277.

Figure 2B:
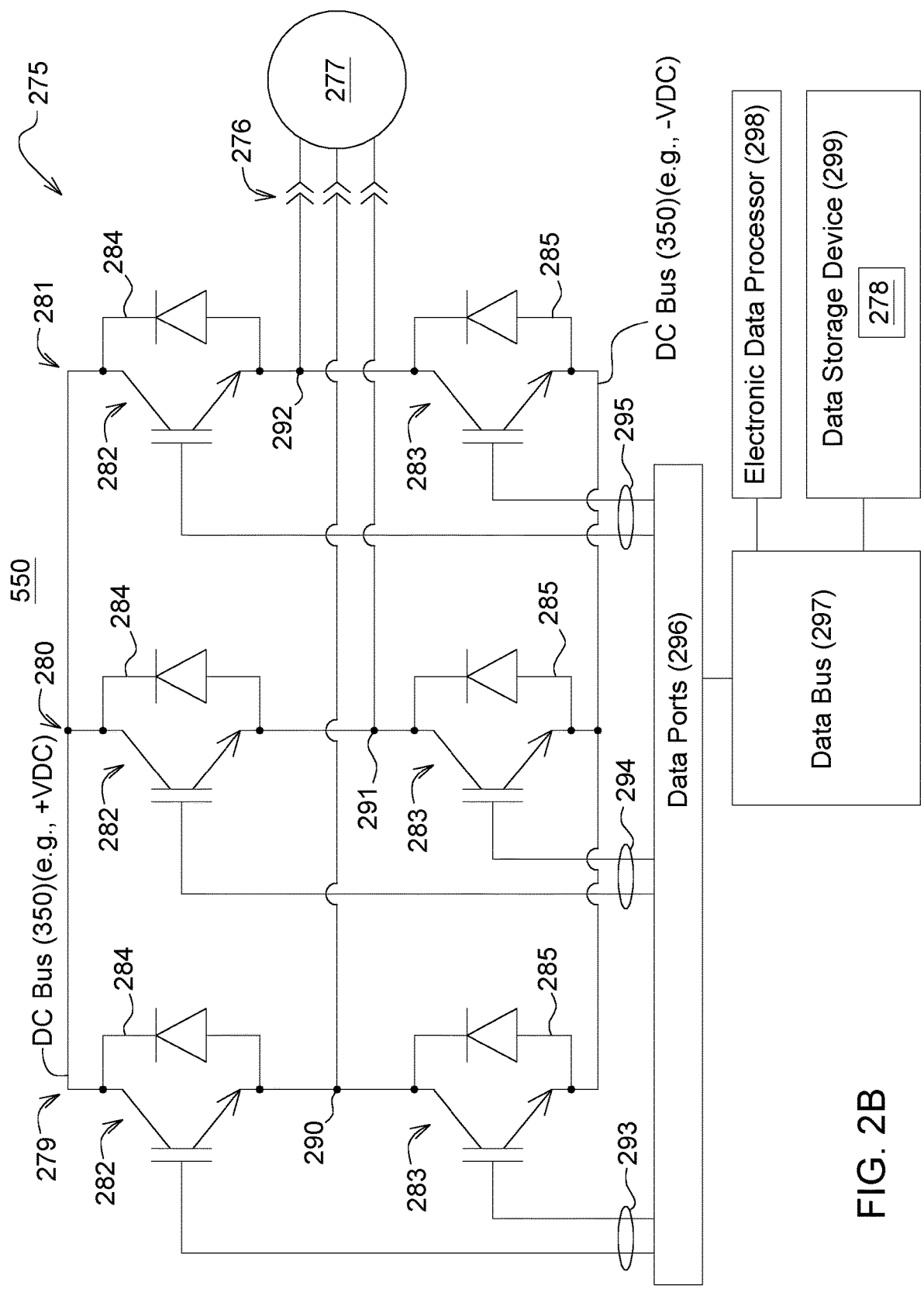
FIG. 2B is a block diagram of one embodiment of an inverter control system, where the switching circuit is illustrated in greater detail.

FIG. 2B is a block diagram of one embodiment of an inverter control system, where the switching circuit 275 is illustrated in greater detail. In FIG. 2B, the inverter comprises an electronic data processor 298, a data storage device 299 and one or more data ports 296 coupled to a data bus 297 to support communications of data messages between or among the electronic data processor 298, the data storage device 299, one or more data ports 296 and data bus 297.

In one embodiment, each phase of the switching circuit 275 comprises a low-side switch 283 and a high-side switch 282. Further, the low-side switch 283 and the high-side switches 282 each have a control terminal and two switched terminals. For example, each low-side switch 283 and each high-side switch 282 comprises a semiconductor switch, such as a field effect transistor, or an insulated gate bipolar junction transistor. If the semiconductor switch comprises a field-effect transistor, the control terminal comprises a gate and the switched terminals comprise a source and drain. However, if the semiconductor switch comprises a bipolar junction transistor, the control terminal comprises a base or insulated gate and the switched terminals comprise an emitter and collector.

In one embodiment, each phase (279, 280, 281) of the switching circuit 275 comprises a low-side switch 283 and a high-side switch 282, the low-side switch 283 and the high-side switch 282 each having a control terminal and two switched terminals. Each high-side switch 282 has its switched terminals coupled in parallel to a high-side diode 284. Meanwhile, each low-side switch 283 has its switched terminals coupled in parallel to a low-side diode 285.

In FIG. 2B, the first phase 279 comprises a low-side switch 283 and a high-side switch 282 with switched terminals coupled in series between the DC bus terminals 350. The first control terminals 293 are connected between the data ports 296 and the control terminals of the switches (282, 283) to control the pulse-width modulation signal outputted at the first output terminal 290. The output of the first phase 279 is at a first output terminal 290. For example, the pulse-width modulation can be configured to resemble, mimic, or attain a generally sinusoidal waveform at the first output terminal 290 (e.g., to control the electric machine in a motoring mode).

The second phase 280 comprises a low-side switch 283 and a high-side switch 282 with switched terminals coupled in series between the DC bus terminals 350. The second control terminals 294 are connected between the data ports 296 and the control terminals of the switches (282, 283) to control the pulse-width modulation signal outputted at the second output terminal 291. The output of the second phase 280 is at a second output terminal 291. For example, the pulse-width modulation can be configured to resemble, mimic, or attain a generally sinusoidal waveform at the second output terminal 291 (e.g., to control the electric machine in a motoring mode).

The third phase 281 comprises a low-side switch 283 and a high-side switch 282 with switched terminals coupled in series between the DC bus terminals 350. The third control terminals 295 are connected between the data ports 296 and the control terminals of the switches (282, 283) to control the pulse-width modulation signal outputted at the third output terminal 292. The output of the third phase 281 is at a third output terminal 292. For example, the pulse-width modulation can be configured to resemble, mimic, or attain a generally sinusoidal waveform at the third output terminal 292 (e.g., to control the electric machine in a motoring mode).

Figure 2C:
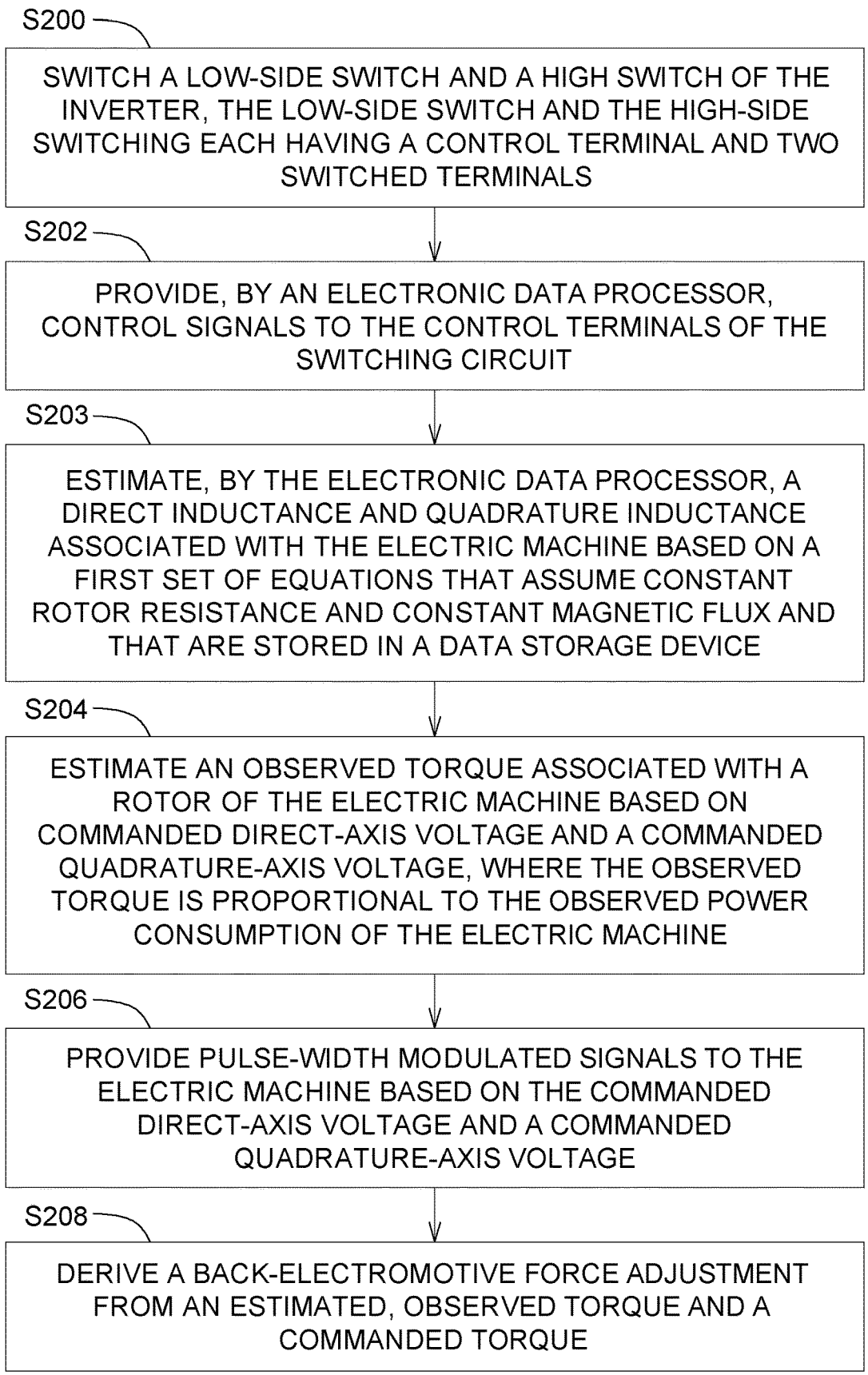
FIG. 2C is a flow chart of one embodiment of a method for controlling an electric machine coupled to an inverter control system.

FIG. 2C illustrates one embodiment of a flow chart of a method for controlling an electric machine 277 via an inverter or controller that incorporates the software and data modules 278 of FIG. 2A. Further, the method of FIG. 2C may be used in conjunction with the inverter system 550 of FIG. 2B, where the inverter system 275 comprises an electronic data processor 298, a data storage device 299, and one or more data ports 296 coupled to a data bus 297 to support communications of data messages between or among the electronic data processor 298, the data storage device 299, one or more data ports 296 and data bus 297. As illustrated in FIG. 2B, the software and data modules 278 may be stored in the data storage device 299 for execution by the electronic data processor 298. Further, the electronic data processor 298 or inverter system 550 may be configured to operate an electric machine in a motoring mode, a regenerative braking mode, or in a power-generating mode.

In FIG. 2C, the method begins in step S200.

In step S200, a switching circuit 275 activates, modulates, or switches a low-side switch 283 and a high-side switch 282 of the inverter. For example, within any given phase (279, 280, 281) the low-side switch 283 is generally switched on or in an on-state, while the high-side switch is generally switched off or in an off-state; vice versa. To the extent that the switching circuit 275 has multiple phases, each phase can operate with a fixed or variable phase offset with respect to one or more other phases.

In step S202, a driver circuit, a pulse-width modulation module 264, or an electronic data processor 298 is configured to provide control signals 265 to the control terminals (e.g., 293, 294, 295) of the switching circuit 275. For example, a driver circuit, a pulse-width modulation module 264, or an electronic data processor 298 is configured to provide control signals 265 to the control terminals of the switching circuit 275 based on an commanded direct-axis input voltage (Vd*) and a commanded quadrature axis voltage (Vq*). Further, the current regulator 262 may provide or input the commanded direct-axis input voltage (Vd*) and a commanded quadrature axis voltage (Vq*) to the switching circuit 275.

In step S203, the electronic data processor 298, or a inductance estimation module stored in the data storage device 299, estimates a direct-axis inductance (Ld) and a quadrature-axis inductance (Lq) associated with the electric machine 277 based on a back EMF constant 273 ($\lambda f$ or an estimated torque 250), a commanded direct-axis voltage (Vd*), a commanded quadrature-axis voltage Vq*), an observed direct-axis current measurement (Id'), observed quadrature-axis current measurement (Iq'), and observed electrical rotor angular speed estimate (we'). Step S203 may be executed in accordance with various techniques, which may be applied separately or cumulatively.

Under a first technique, the electronic data processor 298, or a inductance estimation module 268 stored in the data storage device 299, estimates a direct-axis inductance (Ld) and a quadrature-axis inductance (Lq) associated with the electric machine 277 based on a back EMF constant 273 outputted by the back EMF module 272, commanded direct-axis voltage (Vd*) outputted by the current regulator 262, commanded quadrature-axis voltage (Vq*) outputted by the current regulator 262, observed direct-axis current measurement (Id') outputted by the converter and velocity estimator 266 or a transformation module, observed quadrature-axis current measurement (Iq') outputted by the converter and velocity estimator 266 or a transformation module, and observed electrical rotor angular speed estimate (we') outputted by the converter and velocity estimator 266, a sensorless position/motion estimator, an encoder or a resolver.

Under a second technique, the electronic data processor 298, or an inductance estimation module 268 is configured to estimate a direct-axis inductance and quadrature-axis inductance associated with the electric machine 277 based on a first set of equations that assume a rotor resistance and magnetic flux, such as a constant rotor resistance and constant magnetic flux. For example, the rotor resistance may comprise a nominal, initial, preliminary or default rotor resistance that is storable and retrievable from the data storage device 299 by the processor 298 or storable and retrievable from a remote data storage device incorporated into the electric machine 277. Similarly, the magnetic flux may comprise a nominal, initial, preliminary or default mutual magnetic flux that is storable and retrievable from the data storage device 299 by the processor 298 or storable and retrievable from a remote data storage device incorporated into the electric machine 277.

In step S204, an electronic data processor 298 or torque estimation module 269 estimates an observed or estimated torque 250 associated with a rotor of the electric machine 277 based on one or more of the following data parameters: (a) commanded direct-axis voltage (Vd*) and a commanded quadrature axis voltage (Vq*); (b) observed direct-axis current measurement (Id') and an observed quadrature axis current measurement (Iq'), (c) observed electrical or mechanical angular rotor speed or velocity estimate (we'), and (d) one or more estimated inductance parameters. For example, an electronic data processor 298 or torque estimation module 269 is configured to estimate an observed or estimated torque 271 associated with a rotor of the electric machine 277 based on one or more of the following data parameters: (a) commanded direct-axis voltage and a commanded quadrature axis voltage; (b) observed direct-axis current and an observed quadrature axis current, and (c) observed electrical or mechanical angular rotor speed or velocity, where the observed or estimated torque 271 is proportional to the observed power consumption of the electric machine 277 (e.g., in a motoring mode).

In step S206, the electronic data processor 298 or pulse-width modulation module 264 provides a pulse-width modulated signal to the electric machine 277 based on the commanded direct-axis voltage and commanded quadrature-axis voltage.

In step S208, the electronic data processor 298 or a back electromotive force module 272 determines or derives a back EMF constant 273 or an adjustment to the back EMF constant 277 for a sampling interval or measurement time interval that is based on an estimated, observed torque and a commanded torque 251. Further the back EMF constant 277 or adjusted back EMF constant, modifies the estimated inductances (Ld, Lq) that are applied with the equation-based control of the equation based controller 260 for the MTPA mode, the field weaking mode, or both.

In accordance with one embodiment, as set forth in FIG. 2A, FIG. 2B and FIG. 2C upon electrically connecting an electric machine 277 to a controller, the inverter operates based on preliminary or initial electric machine parameters (e.g., default machine parameters) associated with the corresponding electric machine 277 (e.g., interior permanent magnet electric machine) that are stored, read or retrieved from a data storage device 299 or that are stored, read and retrieved from a remote data storage device incorporated into the electric machine 277. During operation of the electric machine 277 based on the initial electric machine parameters, an inductance estimator 268 of the controller is configured to estimate an estimated direct inductance and an estimated quadrature inductance associated with the electric machine 277 (e.g., without prior characterization, commissioning or testing to establish any reference parameters or look-up tables related to the electric machine 277) based on a first set of equations that assume (e.g., a default, preliminary, or initial) rotor resistance and (e.g., a default, preliminary, or initial) magnetic flux (or a combination of (e.g., default, preliminary or initial) back EMF constant 277 and number pole pairs). Further, the inverter, electronic data processor 298 or inductance estimator 268 estimates the estimated direct inductance and estimated quadrature inductance to be consistent with an operating point or operating region of the maximum torque per amp (MTPA) curve, a maximum torque per voltage (MTPV) curve, and/or a field weakening (FW) region based on respective commanded direct-axis voltage (or current) and a commanded quadrature-axis voltage (or current). Typically, the MTPA (operational) mode and the equivalent MTPV (operational) mode or mutually exclusive to the FW (operational) mode of the combined inverter and electric machine 277.

In one embodiment, a torque estimator 269 is configured to estimate an estimated torque (e.g., observed torque estimate) associated with a rotor of the electric machine 277 based on one or more of the following: (a) the respective commanded direct-axis voltage (or current) and a commanded quadrature-axis voltage (or current) that are derived from a raw commanded torque 251 (e.g., from an operator or end user of the electric machine), where the estimated torque (e.g., observed torque estimate) is generally proportional to the observed power consumption of the electric machine 277, and/or (b) the respective commanded direct-axis voltage (or current), a commanded quadrature-axis voltage (or current, an estimated direct-axis inductance of the electric machine 277, and an estimated quadrature-axis inductance of the electric machine 277.

First, a torque-to-current controller 258 (e.g., proportional integral control) determines a commanded quadrature-axis current 259 based on a commanded torque 251. Second, the electronic data processor 298 or equation-based control module 260 estimates the corresponding commanded direct-axis current to the commanded quadrature-axis current 259: (a) to be consistent with an operating point of the maximum torque per amp (MTPA) curve and/or a field-weakening (FW) region based on respective commanded direct-axis voltage (or current) and a commanded quadrature-axis voltage (or current) and (b) based on the estimated direct inductance and estimated quadrature inductance.

A pulse-width-modulation (PWM) module 264 is configured to provide pulse-width modulated signals (e.g., for each phase) to the electric machine 277 based on the commanded direct-axis voltage and a commanded quadrature-axis voltage. A back-electromotive force constant 273 (e.g., to the commanded direct-axis voltage and the commanded quadrature-axis voltage) is derived from an estimated torque (e.g., observed torque estimate) and a commanded and a final commanded torque 255 to estimate any potential adjustment to the back EMF constant 273, which, in turn, can shift, adjust or transition the operating point, the operating region, the MTPA mode, or the FW mode determined by the equation-based control 260.

In accordance with the embodiment of FIG. 2B, an inverter for controlling an electric machine 277 comprises a switching circuit 275. Each phase of a switching circuit 275 further comprises a low-side switch 283 and a high-side switch 282. The low-side switch 283 and the high-side switch 282 each have a control terminal and two switched terminals. A driver circuit is configured to provide control signals 265 to the control terminals of the switching circuit 275. A data storage device 299 is in communication with the electronic data processor 298.

An equation-based control module 260 (of FIG. 2A) is stored in the data storage device 299 (of FIG. 2B). The equation-based control module 260 comprises software instructions for execution by the electronic data processor 298. An inductance estimator 268 is stored in the data storage device. The inductance estimator 268 comprises software instructions for execution by the electronic data processor 298. In particular, the inductance estimator 268 is configured to estimate direct inductance and quadrature inductance associated with the electric machine 277 based on a first set of equations that assume constant rotor resistance and constant magnetic flux.

In one embodiment, the inverter or software and data modules 278 do not store in the data storage device 299 (e.g. as a factory setting) one or more customized look-up tables that were characterized in a lab to be matched, tailored or aligned with a corresponding particular electric machine 277 to facilitate proper control of the electric machine 277. However, in the data storage device 299 of the inverter 550 or a remote data storage device at the electric machine 277, the inverter 550, the electric machine 277, or both may store a preliminary, initialization look-up table, file, set of records or other data structure that comprises general, preliminary or generic initial values of machine parameters that: (1) represent nominal, temporary or placeholder values, (2) allow the inverter and electric machine 277 to operate together temporarily for estimation final machine parameter values determined in accordance with one or more equations (e.g., via equation-based controller 260) described in this disclosure, and (3) are replaced by the estimated final machine parameters that are determined in accordance with one or more equations described in this disclosure (e.g., via equation-based controller 260), where the final machine parameters are automatically tailored or customized (e.g., during operation by an end under of the electric machine 277 and the corresponding inverter in the field, rather than a lab testing/commissioning/characterization by a skilled technician) to a particular pair or combination of inverter and electric machine 277.

Accordingly, in one configuration, the data storage device 299 of the inverter 550 or remote data storage device of the electric machine 277 may store one or more of the following general initial values of machine parameters: direct-axis (d-axis) inductance, $L_d$ (e.g., nominal, default, or initial direct-axis inductance); quadrature-axis (q-axis) inductance, $L_q$ (e.g., nominal, default, or initial quadrature-axis inductance); stator resistance, $R_s$; back EMF constant 273, $\lambda_f$; and pole pair number, p; where such initial or nominal values are not matched, customized or tailored to the electric machine 277, but rather generic, adequate and sufficient to derive a matched, revised, aligned or tailored adjustment, or final values of machine parameters as the inverter and electric machine 277 operate in the field (e.g., or in distributed equipment to end users, rather than in a lab or factory calibration process).

To the extent that any general initial values of machine parameters, are stored in the remote data storage device 554 of the electric machine or its transceiver 551, such general initial values of machine parameters or revised initial values of machine parameters can be communicated between the electric machine 277 and the inverter 550 via a data communications link 558, where the initial values of the machine parameters can include, but are not limited to direct-axis (d-axis) inductance, $L_d$ (e.g., nominal, default, or initial direct-axis inductance); quadrature-axis (q-axis) inductance, $L_q$ (e.g., nominal, default, or initial quadrature-axis inductance); stator resistance, $R_s$; back EMF constant 273, $\lambda_f$; and pole pair number, p.

Figure 2D:
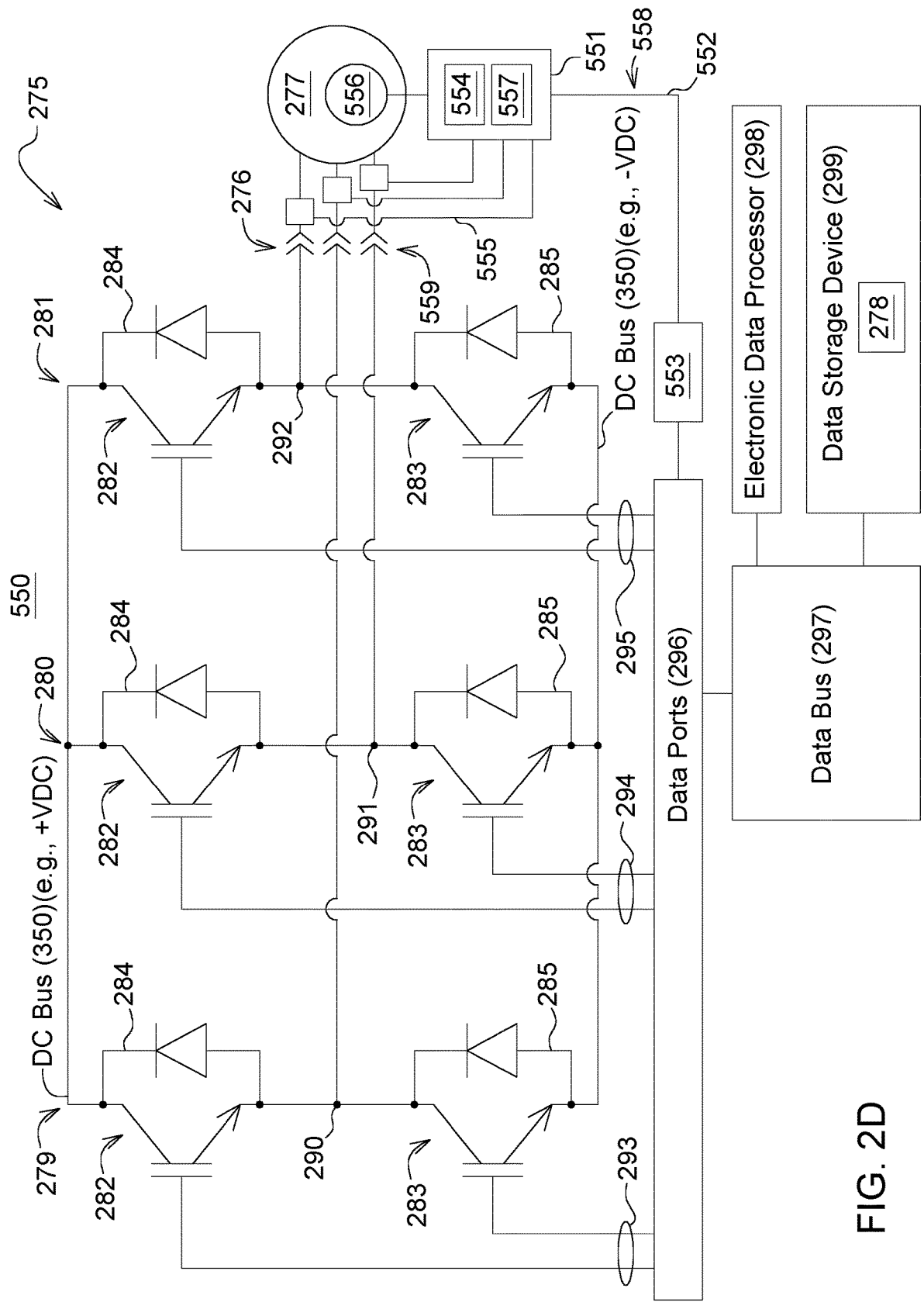
FIG. 2D is a block diagram of another embodiment of an inverter control system, which comprises a communications link between the inverter and electric machine.

As illustrated in FIG. 2D, the data communications link 558 may comprise: a first transceiver 553 at the inverter 550 and a second transceiver 551 at the electric machine 277 that communicate with each other via a communication channel 552, such as a communications line, wireline, twisted pair(s), fiber optical cable, coaxial cable, wireless, optical, and/or electromagnetic communications. The communications channel 552 between the transceivers at the inverter 550 and electric machine 227 may comply with one or more technical standards or communication protocols: Ethernet (e.g., IEEE 802.1, IEEE 802.3, ETHERCAT devices and software for data communications and/or commercially available reduced-latency and reduced-jitter Ethernet interfaces), Controller Area Network (CAN data bus), ISO bus (ISO 11783), wireless local area network (e.g., IEEE 802.11), Flat Panel Display Link (FDP), Low Voltage Differential Signaling (LFDS), or the like. ETHERCAT is a trademark of Beckhoff Automation GmbH.

In one embodiment, the first transceiver 553 at the inverter 550 is coupled to the data bus 297 (or one or more additional data ports 296) that communicate with the data bus 297. The transceivers (553, 551) can communicate with each other via the communications channel 552 for one or more of the following: (a) to transmit, receive, store, retrieve, manage, process, and support communications of data messages, data packets or the like; (b) to transmit, receive, store, retrieve, manage, process and access initial values of machine parameters or revised initial values of machine parameters from the remote data storage device 554; (c) to transmit, receive, store, retrieve, manage, process and to access voltage measurements, current measurements, and/or associated phase measurements, provided by one or more sensors 559, which are associated with the alternating current terminals of the electric machine 277, that are coupled to second transceiver 551 via one or more conductors 555; (d) to transmit, receive, store, retrieve, manage, process and to access rotor speed measurements, encoder measurements and/or torque measurements provided by one or more sensors 556, such as encoders, resolvers and torque sensors. As illustrated, each transceiver (551, 553) may further comprise interface 557, such as a digital-to-analog converter coupled to buffer memory for temporarily holding a buffer of data messages or data packets for processing, encoding, decoding, reception or transmission. In some configurations, the communications link 558 and associated communications channel 552 support real-time communications with acceptable latency and jitter characteristics suitable for control of the electric machine 277.

The extended control modules comprise the equation-based control module 260, the inductance estimator 268, the back EMF module 272 and the torque estimator 269, where any of the modules may incorporate software instructions for execution by the electronic data processor 298. In one embodiment, an inductance estimator 268 is configured to estimate direct inductance ($L_d$) and quadrature inductance ($L_q$) associated with the electric machine 277 based on a first set of equations that assume constant stator resistance ($R_s$) and constant magnetic flux.

A torque estimator 269 is configured to estimate an observed torque associated with a rotor of the electric machine 277 based on, or derived from, a raw commanded torque 251 or the corresponding resultant commanded direct-axis voltage (Vd*) and a commanded quadrature-axis voltage (Vq*), where the estimated torque 271 can be configured to be proportional to the observed power consumption of the electric machine 277. The raw commanded torque 251 is used to determine a corresponding commanded direct-axis current and a corresponding commanded quadrature-axis current (259, 261) that given the estimated direct inductance and estimated quadrature inductance define an operating point or operating region consistent with one or more of the following target operating point parameters or operating region parameters: (a) maximum torque per amp (MTPA) curve or maximum torque per voltage curve (MTPV), (b) field-weakening (FW) voltage ellipse curve, and (c) a target set of torque-speed (e.g., rotor speed) curves, and (d) load on the electric machine 277.

A pulse-width-modulation (PWM) module 264 is generally configured to provide pulse-width modulated signals to the electric machine 277 based on the commanded direct-axis voltage and a commanded quadrature-axis voltage.

In one embodiment, the commanded direct-axis voltage and the commanded quadrature-axis voltage are related to the corresponding commanded direct-axis current and the commanded quadrature-axis current (259, 261) by the equations (e.g., inductance estimation equations) set forth in this disclosure based on variables such as stator resistance, direct axis inductance or quadrature axis inductance and electrical rotational speed of the rotor of the electric machine 277.

The back EMF module 272 derives a back-electromotive force (e.g., back EMF) adjustment to the back EMF constant 273 ($\lambda_f$) from an observed, estimated torque 271 ($T_{em}$) and a final commanded torque 255 ($T_{final}^*$). The back EMF module 272 can apply back EMF adjustment to adjust the final back EMF parameter that is used to calculate the final commanded currents and final estimated torque. For example, the back EMF module 272 is configured to revise or adjust previous (e.g., initial) commanded direct-axis current ($I_d^*$) and previous (e.g., initial) commanded quadrature-axis current 259 ($I_q^*$) values with revised (e.g., final) commanded $I_d^*$ and $I_q^*$ values, or their commanded direct-axis voltage and quadrature-axis voltage equivalents.

The inverter 550, alone or in conjunction with the software and data modules 278, may control the electric machine 277 in accordance with various techniques that may be applied cumulatively or separately.

Under a first technique, the current regulator 262, software and data module 278 or electronic data processor 298 provides an output commanded direct-axis current 261, which is associated with a respective input commanded direct-axis voltage, and an output commanded quadrature-axis voltage, which is associated with a respective commanded quadrature-axis current 259.

Under a second technique, the commanded direct-axis voltage or current 261 and the commanded quadrature axis voltage or current 259 lie on a torque-speed curve (406) or within a torque speed region defined by multiple torque speed curves (406). For example, in the MTPA mode, the equation-based controller 260 is configured to determine commanded direct-axis voltage or current 261 and the commanded quadrature axis voltage or current 259 lie on a torque-speed curve (406) within the MTPA region, which is bounded by the MTPA curve 403, the current limit circle 405 and the axis of the direct-axis current 402 (or alternately by the voltage ellipse 404) of FIG. 4. The torque-speed curve may be selected based on a torque load (e.g. Test 250) on the electric machine 277 (e.g. traction drive motor or an implement electric motor for cutting or processing an agricultural, construction or building material), such as torque load range and/or speed range associated with a particular work task of a vehicle or machine on which the electric machine 277 operates.

Under a third technique, the torque estimator or torque estimation module 269 is configured communicate or cooperate with the torque compensation controller 254, the torque-to-current controller 258, and the equation-based controller 260 to estimate the commanded direct-axis voltage or current 261 and the commanded quadrature axis voltage or current (259, 261) lie within a region of a torque speed curve bounded by a maximum quadrature-axis current 407 based on the estimated torque 271, wherein torque estimator 269 is configured to estimate the estimated torque 271 (T or Tem) in accordance with the following equation:

$$T = \frac{3}{2} p[\lambda_f i_q + (L_d - L_q) i_d i_q]$$

Under a fourth technique, the equation-based control module 260 is configured to determine the commanded direct-axis voltage or current and the commanded quadrature axis voltage or current (261) to lie within a region of a torque-speed curve 406 bounded by a field weakening (FW) voltage ellipse 404 and a set of one or more maximum torque per amp (MTPA) curves 403, wherein the field weakening voltage ellipse 404 is derived based on quadrature-axis current ($i_q$), direct inductance ($L_d$), quadrature inductance ($L_q$) back-electromotive force constant ($\lambda_f$), DC voltage bus ($V_{dc}$), the rotor electrical velocity ($\omega_e$), and the modulation frequency of the alternating current signals applied to the electric machine 277 and wherein the set of one or more maximum torque per amp (MTPA) curves are derived based on quadrature-axis current ($i_q$), direct inductance ($L_d$), quadrature inductance ($L_q$) back-electromotive force adjustment ($\lambda_f$). Further, it is possible to estimate a set of one or more operating MTPA curves (e.g., similar to illustrative MTPA curve 403) based on a selection of d-axis current range and a corresponding torque range, although among MTPA curves there is generally a preferential or target MTPA within the operating region that has a greatest d-axis current range and a greatest torque (e.g., which may be required for efficient operation consistent with the applicable load or to meet an industrial application).

Under a fifth technique, the equation-based control module 260 is configured to determine the commanded direct-axis voltage or current and the commanded quadrature axis voltage or current (261) to lie within a region of a torque-speed curve 406 bounded by a field weakening (FW) voltage ellipse 404 and a set of maximum torque per amp (MTPA) curves, wherein the direct-axis current associated with the field weakening voltage ellipse 404 is determined consistent with the following equation:

$$i_d = -\frac{\lambda_f}{L_d} + \frac{1}{L_d}\sqrt{\left(\frac{\frac{V_{dc}}{\sqrt{3}} f_{util}}{\omega_e}\right)^2 - L_q^2 i_q^2}$$

Under a sixth technique, the equation-based control module 260, alone or together with the extended control modules, are configured to determine the commanded direct-axis voltage or current and the commanded quadrature axis voltage or current (261) that lies within a region of a torque-speed curve bounded by a field weakening (FW) voltage ellipse and a set of maximum torque per amp (MTPA) curves, wherein the corresponding direct-axis current or corresponding set of maximum torque per amp curves is determined consistent with the following equation:

$$i_d = \frac{\lambda_f - \sqrt{\lambda_f^2 - 4(L_q - L_d)^2 i_q^2}}{2(L_q - L_d)}$$

Under a seventh technique, the inverter 550 or the software and data modules 278 do not need a characterization look-up table that defines the electronic machine, such as an interior permanent magnet electric machine 277 (IPM). Instead, the inverter 550 or software data modules 278 comprises a first summer 252 that is coupled to an input of torque compensation controller 254 (e.g., proportional integral controller) and the output of the controller 254 is coupled to the equation-based controller 260, where the equation-based controller 260 comprises an operating region estimator that has a maximum-torque-per-amp (MTPA) region estimation module and a field-weakening (FW) region estimation module. In one embodiment, the first summer 252 receives a commanded torque 251 and an estimated torque 271 output by a torque estimation module 269 to estimate an error signal that is applied to the torque-compensation controller 254. In turn, the torque-compensation controller 254, together with the torque-to-current controller 258, are configured to provide commanded quadrature-axis current 259 to the equation-based controller 260 to support its estimation of the proper operating region: (a) on the d-q axis plane, that is associated with corresponding direct-axis current and quadrature-axis current, and (b) a proper torque and speed Under an eighth technique, the equation-based controller 260 or the electronic data processor 298 of the inverter 550 (or the torque estimation module 269) determines the estimated torque (Test) 250 (or the estimated torque (Tem) 271, respectively, where Tem is substitute for Test) in accordance with the following equation:

$$T_{est} = \eta \frac{3/2[v_d i_d + v_q i_q]}{\omega_{mech}}$$

Under a ninth technique, the back-EMF module 272, alone or in conjunction with the inductance estimation module 268 and the equation-based controller 260, is configured to determine or adjust a back-EMF constant or final back EMF, $\lambda_f$, in accordance with the following equations:

$$T_{est} = \eta \frac{3/2[v_d i_d + v_q i_q]}{\omega_{mech}}$$

$$\lambda_f = \frac{T_{est}}{T_{cmd}} \times \lambda_{initial}$$

The back EMF constant 273 may be defined as the ratio of estimated, measured torque 271 ($T_{em}$ or $T_{est}$) to commanded torque $T_{cmd}$ or final commanded torque 255, Tfinal*. The back EMF constant 273 is multiplied by the initial back EMF, $\lambda_{initial}$, to yield the final back EMF, $\lambda_f$, which may be referred to generally as back EMF. The back EMF constant 273 or back EMF adjustment ratio may be expressed as a percentage, a ratio or a fraction, all which are unitless. The back EMF constant 273 may represent a strength of a linked magnetic flux, such as a linked magnetic flux between the rotor permanent magnets and the stator electromagnets.

If the back-EMF module 272 is configured to adjust the back-EMF constant from a previous (e.g., initial) back-EMF constant to a next or revised (e.g., final) back EMF constant, where the adjustment may be expressed as a differential value, a percentage value, or a fraction. For example, the back-EMF module 272 or the electronic data processor may revise the next back-EMF constant (e.g., for a next sampling interval of the raw commanded torque (T*)) to be within a range (e.g., of approximately eighty-five percent to approximately one hundred and fifteen percent) of the previous or prior back EMF constant 273 (e.g., for the prior sampling interval prior to the next sampling interval of the raw commanded torque (T*)). Accordingly, the adjustment (e.g., differential adjustment) to the present or next back-EMF constant can be determined as a difference, a fractional or percentage change from the previous or prior back-EMF constant. The adjustment to the back EMF constant 273 may be used to provide an improved or more accurate estimate of the strength of the magnetic flux that is associated with operating the electric machine 277 for a time period (e.g., that supports time-averaging or statistical analysis of observations, measurements) under certain rotor speed, ambient temperature, load, or field weakening of permanent magnets in the electric machine 277 responsive to elevated ambient or operating conditions, or other operating conditions and parameters.

The adjustment of the back EMF constant 273 should be distinguished from adjustments to the commanded direct-axis current and commanded quadrature axis current that the electronic data processor 298 is configured to estimate and apply to the windings of the electric machine 277 to reduce or compensate: (a) for any first torque error 253, which is a difference between the raw commanded torque 251 (T*) and the estimated torque 271 (Tem), and/or (b) for any second torque error 257, which is difference between the final commanded torque 255 and measured estimated torque (Test) of the electric machine 277. Similar to above current adjustments to the electric machine 277, the adjustment of the back EMF constant 273 should be distinguished from any equivalent adjustments to the commanded direct-axis voltage and commanded quadrature axis voltage that the electronic data processor 298 is configured to determine and apply to the windings of the electric machine 277 to reduce or compensate: (a) for any first torque error 253, which is a difference between the raw commanded torque 251 (T*) and the estimated torque 271 (Tem), and/or (b) for any second torque error 257, which is difference between the final commanded torque 255 and measured estimated torque (Test) of the electric machine 277.

Under a tenth technique, the inverter 550 or electronic data processor 298 uses the following initial, preliminary or default electric machine parameters that are storable in the data storage device 299 to control the electric machine 277 that are determined by one or more equations during start-up, initialization, or other first operation of the inverter coupled (e.g., electrically) to the respective electric machine 277: $L_d$ (e.g., measured in µH), $L_q$ (measured in µH), $R_s$ (measured in ohms), $\lambda_f$ (unitless ratio) and number of pole-pairs (P) of rotor and stator magnets, such as permanent magnets in the rotor and electromagnets in the stator. However, after the first start-up, first initialization or other first operation of the inverter coupled to the respective machine, the inverter may store automatically, without lab testing or intervention of skilled engineer, technician or any other person, the revised or refined versions (e.g., revised data sets with corresponding time/date stamps) of the electric machine parameters in a data storage device 299 (e.g., electronic non-volatile random access memory) for later access (as revised, adjusted or updated electric machine parameters based on the initial, preliminary or default electric machine parameters) upon the next start-up, next initialization, or next operation of the inverter coupled to the same respective electric machine 277.

Under an eleventh technique, an equation-based method of this disclosure is configured to use a torque-to-current controller 258 (e.g., proportional integral (PI) controller) to determine a commanded quadrature-axis current 259 ($I_q$) based on a given final commanded torque 255 (Tfinal*), which is derived from the raw commanded torque 251 (T*). Next, the equation-based controller 260 is configured to determine the corresponding commanded direct axis current ($I_d$) using the equations defined for the MTPA and/or FW (field-weakening) regions. To the extent that the torque-to-current converter 258 comprises a proportional integral controller, the controller 258 applies a second torque error 257 as feedback (based on estimated torque (Test) from the equation-based controller 260) to control an output signal proportional to the second torque error 257 that is superimposed on a ramp obtained by integrating the commanded quadrature-axis current output 259.

Determining Inductance for the Electric Machine 277

To estimate the inductance of the electric machine 277 during initialization, start-up, or operation of the electric machine 277 coupled to an inverter 550, an electronic data processor 298 of the inverter 550 determines the direct-axis inductance, $L_d$, and quadrature-axis inductance, $L_q$, from steady-state voltage equations based on the initial, preliminary, default or nominal electric machine parameters (e.g., stored in the data storage device 299) of stator resistance, $R_s$, and back-emf constant, $\lambda_f$. In one embodiment, the d-axis voltage and q-axis voltage (collectively d-q axis voltages) in the below equations are the filtered, commanded d-q axis voltages ($V_d^*$ and $V_q^*$) outputted from the current regulator 262 (e.g., CVCR or Complex Vector Current regulator). The remaining variables including the observed direct-axis current, $I_d$, the observed quadrature-axis current, Iq, and electric machine speed ($\omega_e$) are derived, by the converter and velocity estimator 366, from measurements of the three phase voltages (da, db, and dc) at the terminals of the electric machine 277.

During initialization, start-up or operation of the electric machine 277 coupled to an inverter 550, the data processor 298 of the inverter 550 determines or estimates $L_q$ based on the equations below:

$$v_d = R_s i_d - L_q i_q \omega_e$$

$$L_q = \frac{R_s i_d - v_d}{i_q \omega_e}$$

During initialization, start-up or operation of the electric machine 277 coupled to an inverter 550, the data processor 298 of the inverter 550 determines or estimates, $L_d$ is derived from the $V_q$ equations below:

$$v_q = R_s i_q + L_d i_d \omega_e + \lambda_f \omega_e$$

$$L_d = \frac{v_q - \lambda_f \omega_e - R_s i_q}{\omega_e i_d}$$

To execute the above inductance equations, the electronic data processor 298 may retrieve, read, access or obtain from the data storage device 299, the initial values or nominal machine values for the stator resistance and back EMF constant 273 ($\lambda_f$).

In some embodiments, the back EMF may be defined as a voltage that results from multiplying the rotational mechanical velocity ($\omega_{mech}$) of the rotor of the electric machine 277 by the back EMF constant 273 ($\lambda_f$), as adjusted from time to time (e.g., each sampling interval) by an back EMF adjustment. The back EMF module or electronic data processor 298 may limit the adjustment of the back EMF constant to bound or constrain it within a certain percentage (e.g., approximately 90% to 99%) of the nominal, preliminary, or default EMF constant (e.g., that was stored in the data storage device 299 of the inverter 550 or remote data storage device of the electric machine.)

For example, the back EMF is a voltage that opposes the voltages or currents applied to the stator windings of the electric machine 277. The back EMF may arise from the inductance in the stator windings and the changes in the current applied to the stator windings. The back EMF leads to some loss of efficiency in the electric machine 277, where the actual observed torque 271 (Tem) or estimated measured torque tends to be less than the raw commanded torque 251 (T*) in the absence of an adjustment to back EMF constant 273 or a corresponding compensation of increased current or voltage applied to the stator windings.

In practice, the stator resistance and back EMF constant 273 can fluctuate with respective changes in temperature, which can require a temperature adjustment or temperature compensation in the inductances of the electric machine 277. For example, the electric machine 277 may include one or more temperature sensors that measure an observed temperature of a stator winding, electromagnet, a magnet, or the electric machine 277, where the measured observed temperature is associated with a corresponding temperature coefficient (e.g., stored, read, accessible or retrievable from the data storage device 299), where the data processor 298 multiplies a respective original inductance (e.g., $L_d$, $L_q$, or both) by the applicable corresponding temperature coefficient to determine a temperature-compensated inductance (e.g., $L_{dtc}$, $L_{qtc}$, or both) that reduces or eliminates temperature error in the $L_d$ and $L_q$ calculation. Accordingly, in any of the equations a temperature-compensated inductance may replace its counterpart uncompensated or original inductance.

A minimum threshold speed of the rotor of the electric machine 277 may refer to the base speed of the rotor. In some electric machines 277, such as an internal permanent magnet motor (e.g., permanent magnet synchronous motor), the alternating current (AC) voltage at the machine terminals (e.g., three-phase winding terminals) or motor terminals reaches a maximum value at the base speed. For the base speed or a greater speed of the rotor of the AC electric machine 277, the alternating current voltage can be used to charge an energy storage device, such as a capacitor or battery that are coupled to the DC bus terminals 350.

In other electric machines 277, such as a switched reluctance motor, at the base speed the back electromotive force (EMF) is proportional to (e.g., generally equal to) the voltage of the DC bus 350. The back EMF generally increases with the rotor speed.

If the rotor speed of the electric machine 277 is equal to or greater than a minimum speed threshold (e.g., base speed) and if the torque (e.g., raw commanded torque 251) of the electric machine 277 is equal to greater than a minimum torque, the electronic data processor 298 determines the inductance values in accordance with the above equations; the electronic data processor 298 applies the determined inductances to corresponding current calculations. However, if the rotor speed of the electric machine 277 is less than a minimum speed (e.g., base speed) threshold and if the torque (e.g., raw commanded torque 251) of the electric machine 277 is less than a minimum torque, the data processor 298 will not estimate the inductances of the electric machine 277 based on the above equations to avoid potential inaccuracy associated with current and voltage signals with low signal-to-noise ratio. Instead, the data processor 298 or inverter 550 will wait one or more intervals and recheck whether the electric machine 277 is or remains less than a minimum speed threshold (e.g., base speed) and if the torque (e.g., raw commanded torque) of the electric machine 277 is or remains less than a minimum torque. If the commanded torque 251 or rotor speed of the electric machine 277 are below the thresholds, the data processor 298 may use and hold one or more of the following: (a) previous acceptable inductance values determined by the equations until the electric machine 277 transitions to higher load/rotor speed condition that meets the above thresholds, or (b) nominal inductance values or initial inductance values provided by the manufacturer, its specifications, or by factory/lab measurements that apply to the corresponding electric machine 277. In an alternate embodiment, the nominal inductance values or initial inductance values for a particular corresponding electric machine 277 are determined by reference to specifications or inductance values applicable to corresponding model number, serial number or both of the electric machine 277, where the nominal inductance values or initial inductance values can be stored in a readable radio frequency (RF) identification tag attached to the electric machine 277, provided the inverter is configured with a RF tag reader coupled to data ports 296 of FIG. 2B).

Determining Commanded Quadrature-Axis Current 259 (Iq*) for a Corresponding Torque Command The data processor 298 or converter and velocity estimator 266 estimates a rotor speed of the electric machine 277 by a sensor-less (not a senseless) rotor speed detection mechanism, such as estimating the rotor speed by current sensors or voltage sensors on one or more alternating current phases (e.g., stator windings to which one or more substantially sinusoidal signals or quasi-sinusoidal signals that resemble or approximate true sinusoidal signals are applied) by the inverter 550 to the electric machine 277. However, in an alternate embodiment, a rotor speed sensor (e.g., sensor 556 in FIG. 2D) may comprise an encoder, a resolver, or a magnetic field sensor associated with an embedded magnet or magnetized portion of the rotor to provide an estimated or observed rotor speed.

In an alternate embodiment, any current sensor, voltage sensor, voltage magnitude and phase sensor or current magnitude and phase sensor (e.g., individually or collectively sensors 559 in FIG. 2D); any encoder, resolver, magnetic field sensor, or torque sensor (e.g., individually or collectively sensor 556 in FIG. 2D) that measures or observes any operating parameters of electric machine 277 may be provide analog or digital signals, where analog signals are provided to a digital-to-analog converter and outputted to an interface 557 of the transceiver (551, 553) associated with a communications link 558 for communicating data measurements or observations of voltage (da, db, dc), current (e.g., derived from da, db, dc), rotor mechanical speed, rotor electrical speed or torque to the data bus 297 (or one or more additional data ports 296) of the inverter 550, and/or to the converter and velocity estimator 266.

If the observed rotor speed is less than or equal to a first rotor speed threshold, then the electronic data processor 298 or controller of the inverter 550 may operate in the MTPA region of the direct-quadrature current plane (e.g., defined by a combination of an inverter 550 and electric machine 277) or in corresponding MTPA mode. The maximum quadrature axis current tends to be associated with a corresponding maximum operational torque or maximum operational torque region of the electric machine 277. For the MTPA mode, the maximum quadrature-axis current Iq 407 is defined as the point where the MTPA curve 403 intersects the current limit circle 405. Further, in the MTPA mode the electronic data processor 298 or controller of the inverter uses a first equation for estimation of peak Iq or maximum quadrature-axis current, Iq (e.g., $I_{q\_max}^{MTPA}$) based on MTPA region as follows:

$$I_{q\_max}^{MTPA} = \sqrt{I_{s\_max}^2 - \left(\frac{\lambda_f - \sqrt{\lambda_f^2 + 8(L_q - L_d)I_{s\_max}^2}}{4(L_q - L_d)}\right)}$$

where:

$I_{s\_max}$ is the maximum quadrature-axis current of the stator windings of the electric machine 277 within the MTPA region or on the MTPA curve 403.

In practice, the maximum quadrature-axis current of the stator windings may be aligned with or limited by the current ratings of the semiconductor switches (282, 283) in the switching circuit 275 of the inverter 550. For example, the first equation to determine maximum quadrature-axis current, Iq, (e.g., $I_{q\_max}^{MTPA}$) may represent the operating region (or peak $I_q$) where the MTPA curve intersects a current limit circle 405 (e.g., circumscribing an arc about an origin of the $I_q$ and $I_d$ axes.)

However, if the observed rotor speed is greater than a first rotor speed threshold or base speed of the electric machine 277, then the electronic data processor 298 or controller of the inverter 550 may operate in the field-weakening region or the corresponding field weakening mode. In one embodiment, the filed weakening mode is generally mutually exclusive to the MTPA mode. Further, in the field weakening mode the electronic data processor 298 or controller uses a second equation for estimation of peak Iq or maximum, $I_{q\_max}^{FW}$, based on field weakening as follows:

$$I_{q\_max}^{FW} = \frac{\left(\frac{V_{dc}}{\sqrt{3}}\right)f_{util}}{w_e L_q},$$

where $f_{util}$ is the utilization factor with a range between 0 and 1.

In one embodiment, the utilization factor measures the output power of the inverter 550 divided by the sum of power switched by or within each of the output semiconductor switches in the inverter, based on a corresponding duty cycle or fixed duty cycle. Therefore, limiting the utilization factor can protect the inverter 550 from thermal damage. In another embodiment, the utilization factor comprises a voltage utilization factor expressed as percentage of the dc bus voltage (e.g., 95 percent of the DC bus voltage).

Once an estimated rotor speed of the electric machine 277 is above the first rotor speed threshold or base speed of the machine, the current commands no longer track along the MTPA curve, but follow the voltage ellipse instead of the FW mode. For example, in the field weakening mode the Iq maximum limit is not based on Iqmax 407 for the MTPA mode, but rather based on the Iq maximum calculated within the FW region bounded by the current limit circle 405 and the voltage ellipse 404; hence, the corresponding equations for the voltage ellipse apply in the FW mode. For example, in FW region, the maximum torque may be associated with the voltage ellipse curve 404, and can possibly align with one or more torque speed curves 406.

Determining Corresponding Lowest Current Magnitude of Commanded Direct-Axis Current (Id*) to Reach Target Commanded Torque 251

The data processor 298 or inverter 550 can apply the commanded quadrature-axis current $I_q$ of the PI controller 258 into the equations of the equation-based controller 260 to calculate the corresponding commanded direct-axis current ($I_d$ command) or a matched pair of the commanded q-axis current and commanded d-axis current 261. In one embodiment, for the MTPA region, the data processor 298 of the inverter 550 determines the current commands (e.g., commanded Id current 261) such that the commanded torque 251 or the estimated, measured torque 271 is reached with the smallest current magnitude possible. In one embodiment, the equation-based controller 260 in the MTPA mode is configured to determine the corresponding commanded indirect-axis current (Id*) following the MTPA curve by applying the following equation:

$$i_d^{MTPA}* = \frac{\lambda_f - \sqrt{\lambda_f^2 - 4(L_q - L_d)^2 i_q^2}}{2(L_q - L_d)}$$

The above commanded indirect-axis current ($I_d$*) is a function of the estimated back EMF constant 273, $\lambda_f$; inductances 270 $L_q$, $L_d$; and commanded quadrature-axis current 259 ($I_q$ or $I_q$*).

Determining Adjustments for Field Weakening (FW) Region Mode

For the field weakening region, which is above the minimum threshold rotor speed (e.g., base speed) of the electric machine 277, the voltage of the DC bus 350 may be limited, or rather place attendant limits on the extent of size of the FW voltage ellipse 404. The commanded direct-axis current, $i_d^{FW}$* for the field weakening mode, is a function of the voltage of the DC bus 350, electric rotor speed of electric machine 277, estimated inductances 270, back-EMF constant 273, and the commanded quadrature-axis current 259, $I_q$*. The value of utilization factor, $f_{util}$, is selected to protect the inverter 550, where the value may range from 0 to 1. For example, the utilization factor can be set to (use) ninety-five percent (e.g., 95%) of the available voltage of DC bus 350 or its associated power, which may limit, scale or reduce the size of the FW voltage ellipse 404. In the field weakening mode, the inverter or data processor operates above the minimum threshold speed of the electric machine 277, the commanded current 261 (e.g., commanded direct-axis current) no longer tracks along the MTPA curve, but follows the voltage ellipse instead. The following equation gives the $i_d^{FW}$ as a function of the $i_q$* command:

$$i_d^{FW}* = -\frac{\lambda_f}{L_d} + \frac{1}{L_d}\sqrt{\left(\frac{\frac{V_{dc}}{\sqrt{3}}f_{util}}{\omega_e}\right)^2 - L_q^2 i_{q*}^2}$$

Transition Between MTPFA Mode and FW Mode

During operation, the inverter 550, alone or together with the software and data modules 278, automatically switch between the MTPA mode and FW mode based upon terminal voltage, or squared total terminal voltage the represents the sum of the squares. Regardless of which mode the inverter 550 is operating in, for a current sampling interval of the raw commanded torque and measured, estimated torque and associated measured, estimated (electric or mechanical) rotor speed ωe, direct-axis current (Id'), quadrature-axis current (Iq') 267, the equation-based controller 260 or data processor 298 is configured to determine current commands (of d-axis and q-axis commanded currents) simultaneously for MTPA and FW regions, such as a first current command pair for the MTPA mode and a second current command pair for the FW mode. Further, based on estimated parameters, the current regulator 262 or data processor 298 is configured to determine the corresponding terminal voltages simultaneously for each region, including but not limited to the MTPA region and the FW region. For any phase the voltage of the stator winding can be measured or estimated based on measurements, which the converter and velocity estimator 266 transforms to the d-q reference frame or plane. For instance, within the d-q reference frame, a lowest voltage of any phase of the stator windings (of the electric machine 277) represents the limiting terminal voltage; the data processor 298 determines which mode the inverter 550 operates in based on the such limiting terminal voltage, consistent with the following equation:

$$V_s^2 = v_d^2 + v_q^2$$

In one embodiment, the inverter 550 and the data processor 298 may transition between the FW mode and MTPA mode, or vice versa, via a hysteresis band based on observed terminal voltage (e.g., of the alternating current terminals of the electric machine 277). For example, the hysteresis band may delay a transition between the modes for one or more sampling intervals or a predetermined time period until an average, mean or mode of the limiting terminal voltage suggests that a change is required. Therefore, the inverter 550 and the data processor 298 are configured with the hysteresis band to ensure that there is not instability or oscillation between modes which could cause disturbances with the control of the electric machine 277.

Adjustment of the Commanded Direct-Axis Current (Iq*)

The equation-based controller 260 is configured to determine estimated torque 250 (Test) based on the commanded direct-axis current and the commanded quadrature-axis current 259 in accordance with the following equation:

$$T = \frac{3}{2}p[\lambda_f i_q + (L_d - L_q)i_d i_q]$$

Further, estimated torque 250 (Test) serves as the feedback loop for the torque-to-current controller 258 (e.g., PI controller) to adjust the commanded $I_q*$ 259 accordingly.

In an alternate configuration, to determine the estimated torque to be fed back to the controller 260, to the back EMF adjustment module 272, or within the software and data modules 278, the equation-based controller 260 can also estimate torque using the terminal power equation with speed in accordance with the following equation:

$$T_{est} = \eta \frac{\frac{3}{2}[v_d i_d + v_q i_q]}{\omega_{mech}}$$

Figure 3:
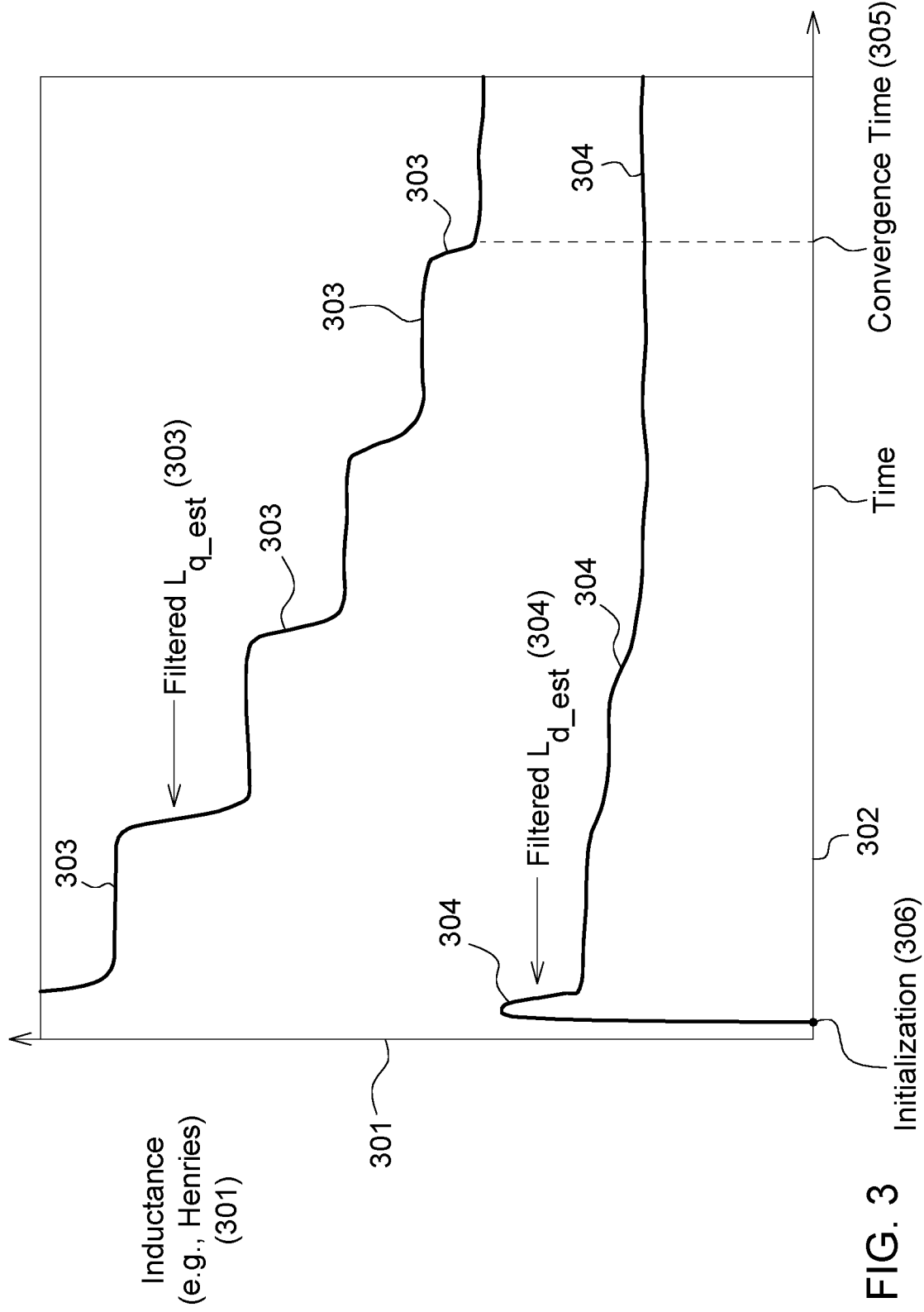
FIG. 3 is a graph of illustrative estimated inductance(s) versus time for one embodiment of the inverter control system.

FIG. 3 is a graph of illustrative time-varying estimated inductance(s) (303, 304) versus time for one embodiment of the inverter 550 and its associated software and data modules 278. The vertical axis represents inductance 301, which may be expressed in Henries. The horizontal axis represents time 302, where the convergence time 305 is shown in the dashed lines. The filtered or estimated quadrature-axis inductance 303 and filtered or estimated direct-axis inductance 304 are aligned on the same time scale of the horizontal axis.

At an initialization time 306, the electronic data processor 298 or the inductance estimation module 268 starts by retrieving an initial, default or preliminary value of the inductances (Ld, Lq) from the data storage device 299. During operation of inductance estimation module 268 or inductance estimator, alone or together with the software and data modules 278, the inductance estimation module 268 converges on a final value or final inductance values (Ld, Lq) (e.g., sometimes even temperature-compensated inductances achieved over continuous operation of the electric machine 277 may take longer to converge) at a convergence time 305, which coincides with the completion of the automated characterization or commissioning of the electric machine parameters while operating the inverter and electric machine 277 in the field, without any assistance of a skilled technician. For example, the inverter may comprise the electronic hardware of FIG. 2B and the software and data modules 278 of FIG. 2A.

Figure 4:
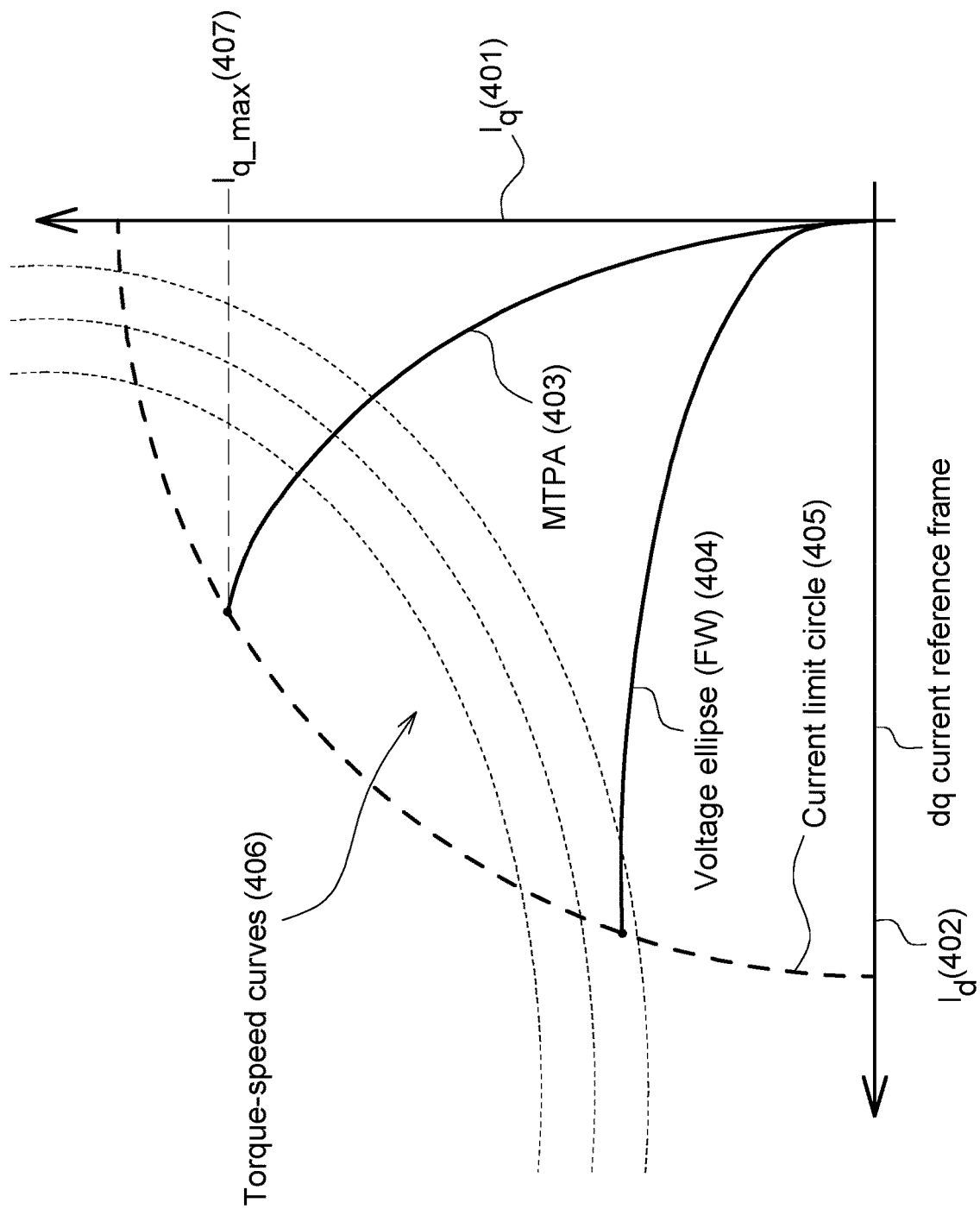
FIG. 4 is a graph of the quadrature axis current versus direct axis current associated with targeted operating points for controlling the electric machine.

FIG. 4 is a graph of the direct-quadrature current plane in which a first axis represents quadrature-axis current 401 (e.g., commanded quadrature axis current) and a second axis represents direct-axis current 402 (e.g., commanded direct-axis current) associated with targeted operational points or targeted operational regions for controlling the electric machine 277. As shown, the horizontal axis indicates direct-axis current 402 in a rotating d-q axis reference frame. Meanwhile, the vertical axis indicates the corresponding quadrature-axis current 401 in the rotating d-q axis frame. Collectively, the direct-axis current and the quadrature-axis current define a d-q current plane. In one embodiment, the equation-based control module 260 or electronic data processor 298 uses equations, final look-up tables or other data structures that can control the electric machine 277 in accordance with an MTPA mode, a FW mode, or both consistent with the curves, operational regions, and operational points that are illustrated in FIG. 4.

A first operational boundary of the electric machine 277 (e.g., interior permanent magnet synchronous electric machine) is defined by the current limit arc 405, which is also referred to as the current limit circle. In the d-q current plane of FIG. 4, the current limit arc 405 is defined by an arc (e.g., a circular portion) that is based on thermal and power handling capabilities of the electric machine 277 and the inverter (e.g., switching circuit 275).

A second operational boundary of the electric machine 277 is defined by the voltage ellipse 404, which is also referred to as a field weakening voltage ellipse. The first operational boundary and the second operational boundary can be applied cumulatively to determine the operational region of the electric machine 277 and respective inverter. Separate from the current limit arc, one or more voltage ellipses can be defined, where each voltage ellipse 405 corresponds to the electric rotational speed of the rotor of the electric machine 277. Further, the higher the electric rotational speed of the rotor of the electric machine 277, the smaller the radius of the elliptical arc of the voltage ellipse 404. The voltage ellipse depends on the following constraints: direct-axis inductance, the quadrature-axis inductance, the electric rotational speed of the rotor and maximum design voltage (e.g., related to DC bus voltage) for the stator windings of the electric machine.

For the MTPA mode, the equation-based control module can select any of the following operational points or operational regions that are within the current limit arc 405 (e.g., in the operational region between the axes ($i_q$ axis 401, $i_d$ axis 402) and the current limit arc 405): (a) an operating point that is on the MTPA curve 403 and below the maximum quadrature-axis current (Iq) or maximum commanded quadrature-axis current, (b) an operating point that is at intersection of the MTPA curve 403 and associated with one or more targeted torque-speed curves 406, (c) a first MTPA operational region that is bounded by the current limit arc 405 and the MTPA curve 403 and an axis 402 of the direct-axis current (e.g., commanded direct-axis current or horizontal axis of FIG. 4) or alternately by the voltage ellipse 404, (d) a second operational region that is bounded by the current limit arc 405 and the MTPA curve 403 and the direct-axis current 402 and associated with one or more targeted torque-speed curves.

For the field weakening mode, the equation-based control module 260 can select any of the following operational points or operational regions that are within the current limit arc 405 and the voltage ellipse 404 that corresponds to the electrical rotational speed of the rotor. Accordingly, at higher electrical rotational speeds of the rotor, the field weakening mode tends to have lesser operational region, relative to the greater operational region of the MTPA mode that is suitable for lower electrical rotational speeds. For example, the field weakening operational region of FIG. 4 is defined by the region bounded by the voltage ellipse 404, the current limit circuit 405, and the direct-axis current 402 (e.g., or the horizontal axis of FIG. 4).

Figure 5:
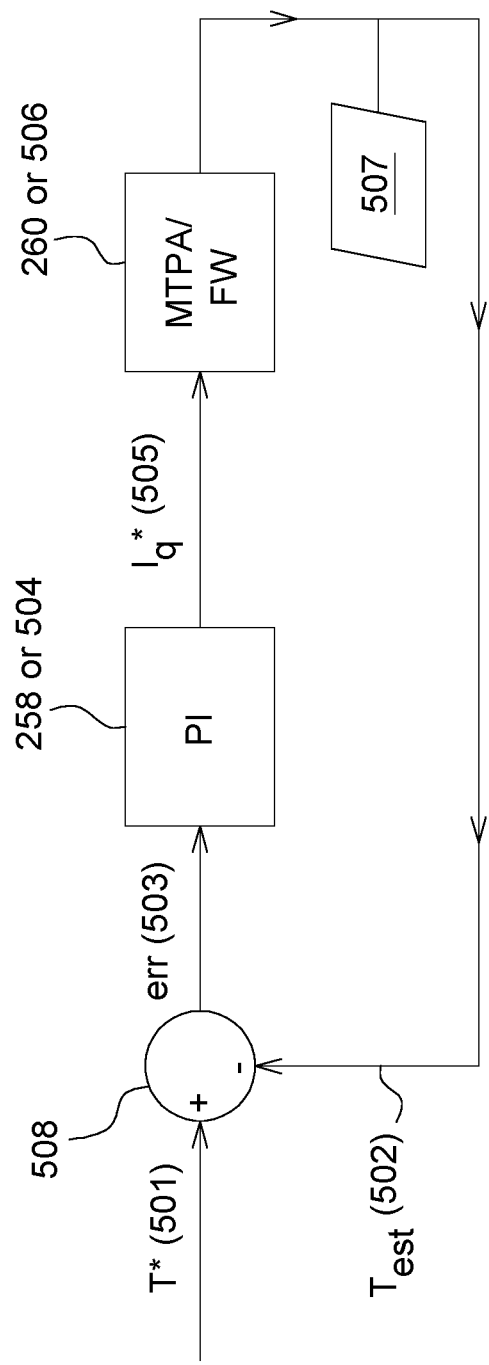
FIG. 5 is a block diagram of a method of torque estimation without a look-up table, which is based on a proportional integral controller in conjunction with a estimations of maximum-torque-per-amp, direct-axis current curve and a direct-axis current, field weakening curve.

FIG. 5 is a block diagram of a method of torque estimation without a look-up table. During initialization and operation of the electric machine 277, in response to commanded torque 501 a proportional integral controller 504, in conjunction with an equation-based controller 506, determine estimations of: (1) commanded direct-axis current and commanded quadrature-axis current (505), and (2) a maximum-torque-per-amp (MTPA), a field weakening (FW) curve.

In one configuration, the commanded torque 501 and an estimated torque 502 are inputted into a summer 508 for a sampling interval. The summer 508 outputs a torque error signal 503 for the sampling interval. The torque error signal 503 alone, or the torque error signal and the commanded torque 501 together, are communicated to the proportional integral controller 504 to determine: (a) a differential change in a commanded quadrature-axis current from a previous commanded quadrature-axis current from one or more previous sampling intervals, (b) a commanded quadrature-axis current.

The equation-based controller 506 determines the commanded direct-axis current and commanded quadrature-axis current (collectively commanded d-q axis current data 507) that are: (a) consistent with the received commanded quadrature-axis current (from proportional integral controller 504) or a differential change from the proportional integral controller 504, and (b) based on the appropriate operational regions given the rotor electrical speed (or velocity) and commanded torque, where the operational regions comprise at least the MTPA mode and the FW mode. The equation-based controller 506 also determines the estimated torque consistent with the commanded direct-axis current and commanded quadrature-axis current, the operational mode (e.g., MTPA mode or FW mode) and the corresponding operational region or operational point within that operational mode.

Figure 6:
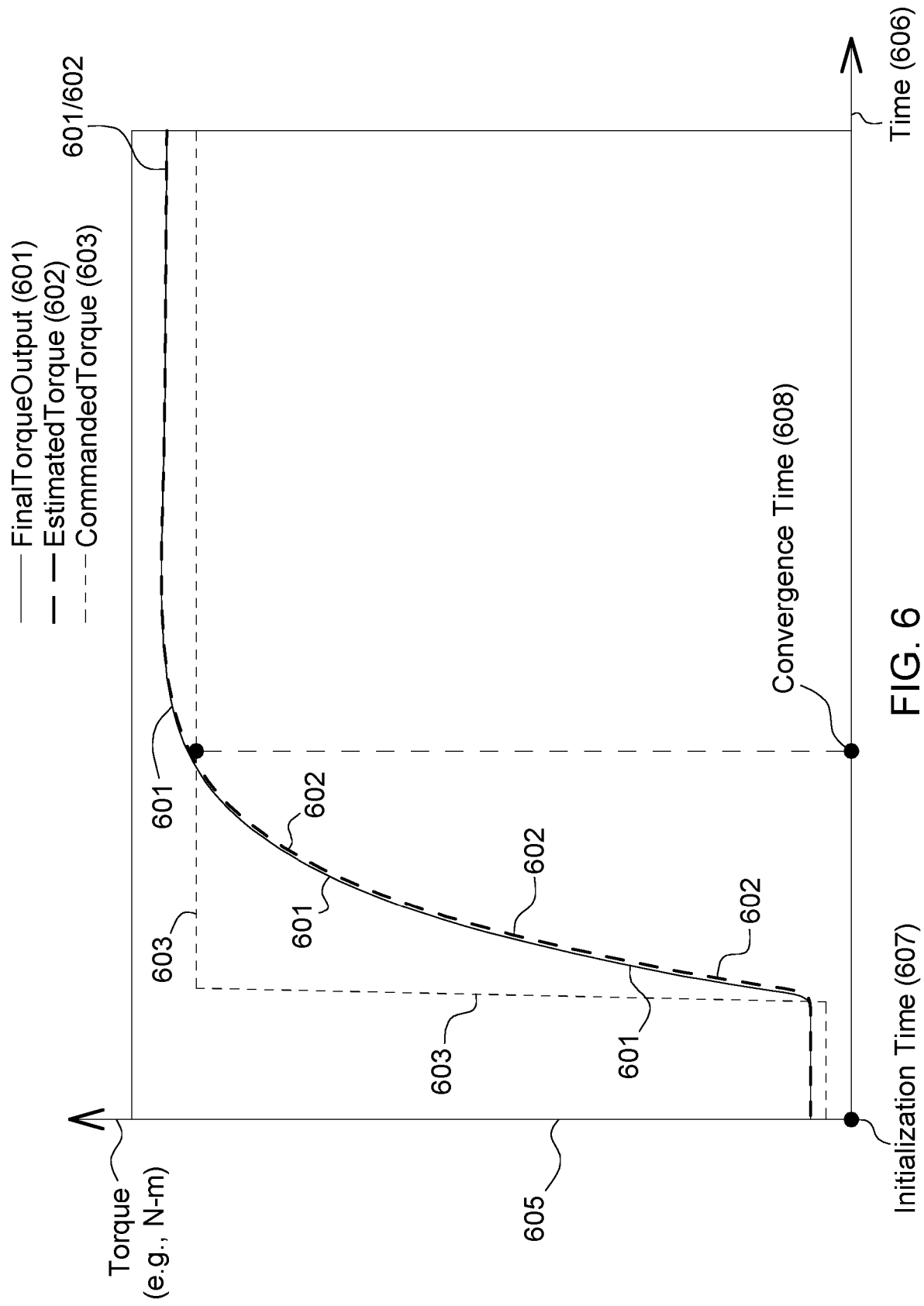
FIG. 6 is a graph of torque command, estimated torque, and final or actual torque versus time.

FIG. 6 is a graph of commanded torque 603, estimated torque 602, and final torque 601 versus time. The vertical axis indicates torque 605, which can be expressed in Newton-meters (N-m) The horizontal axis indicates time 606. The commanded torque 603 is shown in thin dashed lines. The estimated torque 602 is illustrated in bold or thick dashed lines. The final torque 601 is illustrated in solid line. The progression of the commanded torque 603, estimated torque 602 and final torque 601 is illustrated from an initialization time 607 (which is a start-up after applying electrical energy to the inverter of FIG. 2B or switching circuit (275) coupled to the electric motor 277) to a convergence time 608. At the convergence time 608, the commanded torque 603 coincides substantially with the final torque output 601, which also agrees with the estimated torque 602. For example, at the convergence time 608, the torque estimation module 269 provides an estimated torque (271 or 602) that aligns with, coincides with or equals the commanded torque (251 or 603).

Figure 7:
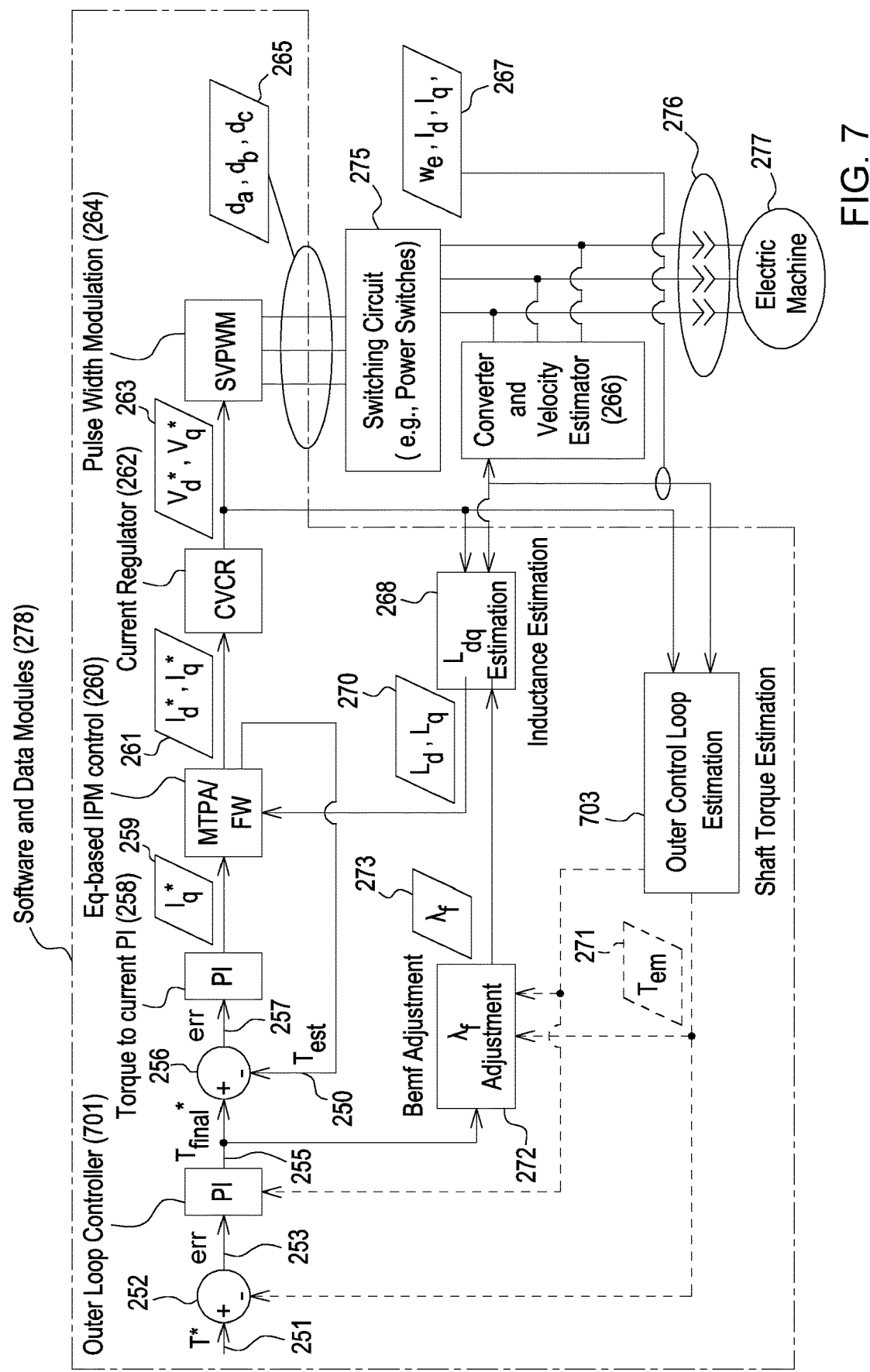
FIG. 7 is block diagram of another embodiment of an inverter control system for controlling an electric machine coupled to the inverter control system.

The system of FIG. 7 is similar to FIG. 2A, except the torque compensation controller 254 of FIG. 2A is replaced by an outer loop controller 701 and the torque estimation module 268 is replaced by an outer loop estimator 703. Further, in FIG. 7, the estimated torque 271 is indicated as optional by the dashed lines. Like reference numbers in FIG. 2A and FIG. 7 indicate like elements.

In FIG. 7, the outer control loop controller 701 comprises one or more of the following: a torque controller (e.g., 254), a speed controller (or velocity controller), and a voltage controller. Accordingly, the outer loop controller 701 may be illustrated as containing blocks (composed of dashed lines to indicate their optional nature) that represent the control modules (e.g., software, electronics or both) for the torque controller, speed controller (or velocity controller) and/or a voltage controller.

Meanwhile, to support the outer loop controller 701, the outer control loop estimator 703 comprises one or more of the following: (a) a torque estimation module, (b) a speed estimator or velocity estimator, and (c) a control voltage estimator (e.g., to derive such estimates, of torque, velocity and/or voltage, from measurements at the alternating current terminals 276 electric machine 277). Accordingly, the outer control loop estimator 703 may be illustrated as containing blocks (composed of dashed lines to indicate their optional nature) that represent the control modules (e.g., software, electronics or both) for the torque estimation module, the speed estimator or velocity estimator, and the control voltage estimator.

In one embodiment, a torque estimation module (of the control loop estimator 703) is configured to provide an estimated torque (Tem, such as optional Tem 271 indicated by dashed lines) of the rotor shaft of the electric machine 277 (e.g., to first summer 252). The torque estimation module (of the control loop estimator 703) may provide the estimated torque to facilitate one or more of the following control modes: (a) a collective torque control and speed control mode that uses the estimated torque and speed error (velocity error), and (b) a collective torque control and voltage control mode that uses estimated torque and voltage feedback error, and (c) a collective torque control, speed control and voltage control mode that uses the estimated torque, speed error (velocity error), and voltage feedback error control.

In one example, speed estimator or velocity estimator (of the control loop estimator 703) is configured to provide, to the outer loop controller 701, a speed error (or velocity error) of the rotor shaft of the electric machine 277 based on a difference between observed speed (e.g., observed rotor speed or observed velocity) from the converter and velocity estimator 266 and a target speed (e.g. target rotor speed, target rotor velocity, commanded speed, or commanded rotor velocity) of the rotor of the electric machine 277. Further, the outer loop controller 701 can use the speed error/velocity error (alone or together with other error estimates, such as the torque error and voltage feedback error) to adjust the final commanded torque (Tfinal*), which represents a speed-adjusted, final commanded torque.

In another example, a control voltage estimator (of the outer control loop estimator 703) is configured to provide, to the outer loop controller 701, a voltage feedback error based on a difference between observed control voltages (e.g., at the respective alternating current terminals 276 to the electric machine 277 and after conversion or transformation, by converter and velocity estimator 266, to the appropriate stationary and/or rotating d-q voltage axes) and corresponding target control voltages (e.g., commanded control voltages 263, such as Vd* and Vq* available from the current regulator 262). Further, the outer loop controller 701 can use the voltage feedback error (alone or together with other error estimates, such as the torque error and speed error or velocity error) to adjust the final commanded torque 255 (Tfinal*) to represent a voltage-feedback-adjusted, final commanded torque.

In one embodiment, the outer loop controller 701, or one or more of its constituent control modules, comprise a proportional integral controller. For example, the proportional integral controller can use feedback control in which one signal proportional to the error (e.g., first torque error 253 signal, a speed error (or velocity error), and/or a voltage feedback error) is superimposed on a ramp obtained by integrating the corrected output (e.g., final commanded torque 255), where the integral correction increases in response to the magnitude of the error (e.g., first torque error 253 signal, a speed error (or velocity error), and/or a voltage feedback error) and the time (e.g., one or more sampling intervals) during which the error persists.

In contrast, in an alternate embodiment, the outer loop controller 701, or one or more of its constituent control modules, use a proportional integral derivative (PID) controller. A PID provides a correction based on proportional control, integral control and derivative control terms, where proportional control of an output parameter (e.g., final commanded torque 255) is proportional to an error (e.g., first torque error 253 signal, a speed error (or velocity error), and/or a voltage feedback error) and the derivative control adjusts or dampens the rate of change of the error correction. The output of the outer loop controller 701 is capable of communication with a back-EMF adjustment module 272 and a second summer 256.

In a speed control mode (or velocity control mode), alone or together with the torque control mode, the outer control loop controller 701 can provide the final estimated torque 255 of the rotor of the electric machine 277 based on the torque error and the speed error (or velocity error). Similarly, in the feedback voltage control mode, alone or together with the torque control mode, the outer control loop controller 701 can provide the final estimated torque of the rotor of the electric machine 277 based on the torque error and the voltage feedback error. In an aggregate control mode, the outer loop controller can provide the final estimated torque 255 of the rotor of the electric machine 277 based on any or all of the following: estimated torque error, estimated speed or velocity error, and estimated voltage feedback error.

In an alternate embodiment, the torque estimator (of the outer control loop estimator 703) is deleted, inactive or disabled; hence, no estimated torque 271, Tem, is provided as an input to the first summer 252 (as indicated by the dashed line terminating in the arrowhead), or such estimated torque 271, Tem, may be set to zero. There is no, non-zero estimated torque 271 to generate the torque error 253, such that the commanded torque 251, T*, appears at the output (labeled torque error 253) of first summer 252. For instance, the commanded torque 251, T*, altogether supports a operator or user input to control the torque of the electric machine 277, without direct torque error (e.g., 253) in the event of speed control, voltage control, or both (e.g., which may indirectly compensate for torque error).

In accordance with one embodiment, upon electrically connecting (e.g., removably, revocably, temporarily or permanently) an electric machine to a controller, a controller is well-suited to operate immediately the electric machine and to estimate direct inductance and quadrature inductance associated with the electric machine based on a first set of equations that assume constant rotor resistance and constant magnetic flux. Further, upon electrically connecting (e.g., removably, revocably, temporarily or permanently) an electric machine to a controller, a controller is well-suited to operate immediately the electric machine and to estimate direct inductance and quadrature inductance associated with the electric machine the without prior characterization, commissioning or testing to establish any reference parameters or look-up tables related to the electric machine. Accordingly, the controller or inverter may be installed or mounted on a vehicle, whereas the electric machine may be installed or mounted on an implement that supports a removable electric connection or coupling (e.g., between two mating parts of an electrical connector).

Even if the manufacturer of the vehicle is different than the manufacturer of the implement, such that technical parameters of the electric machine are not available or previously stored in the data storage device of the controller, the controller is sufficiently compatible with the unknown or uncharacterized machine to operate it until the controller can converge on a final control parameters based on the iterative application of equations that model the corresponding characteristics of the electric machine. The compatibility between the controller/inverter (on a vehicle) and a corresponding electric machine (e.g., on an implement to be mechanically and electrically coupled to the vehicle) can be referred to as the implement "hook-up and go" feature or "plug-and-play" feature.

Further, in the context of heavy equipment, construction equipment, mining equipment, road repair, maintenance and resurfacing equipment, and agricultural equipment, even if the electric machine is characterized or matched to an inverter or motor controller, the alternating current phase cables or conductors that connect the electric machine to the inverter can be different (e.g., longer or have different connectors) than in a lab or test fixture where the characterization or commission was done by a commission. Here, the aforementioned hook-up and go feature or plug and play features supports a self-propelled vehicle (e.g., tractor) with an inverter (e.g., motor controller) that may removably couple to (control) one or more alternating current electric machines on or associated with an implement that is mechanically connected or coupled to the tractor. Accordingly, the coupling between the inverter and the one or more alternating current electric machines may use cables that carry alternating current between the inverter and the one or more alternating current electric machines, where such cables and associated connectors can potentially introduce additional resistance and inductance, or impedance variation, in conjunction with the stator windings.

In accordance with this disclosure, the inverter is well suited for controlling alternating current electric machines, such as internal permanent magnet (IPM) electric motors or loads, without any customized or dedicated look-up table that is characterized in a lab and stored in the data storage device as factory settings for electric machine parameters.

Although certain embodiments of inverters, converters, motor controllers, systems, methods, processes and examples have been described in this disclosure, the scope of the coverage of this disclosure may extend to variants of the inverters, converters, motor controllers, systems, methods, processes and examples and systems and concepts disclosed herein. For example, in any patent that may be granted on this disclosure, one or more claims can cover equivalents and variants to the full extent permitted under applicable law, among other things.

The following is claimed:

1. An inverter for controlling an electric machine, the inverter comprising:
   a switching circuit comprising a low-side switch and a high-side switch, the low-side switch and the high-side switching each having a control terminal and two switched terminals;
   a driver circuit for providing control signals to the control terminals of the switching circuit;
   an electronic data processor;
   a data storage device in communication with the electronic data processor;
   a control module stored in the data storage device, the control module comprising software instructions for execution by the electronic data processor, the control module comprising:
   an inductance estimator to estimate direct inductance and quadrature inductance associated with the electric machine based on a first set of equations that assume constant rotor resistance and constant magnetic flux;
   a torque estimator to estimate an observed torque associated with a rotor of the electric machine based a commanded direct-axis voltage and a commanded quadrature-axis voltage, where the observed torque is proportional to the observed power consumption of the electric machine;
   a pulse width modulation module for provided pulse-width modulated signals to the electric machine based on the commanded direct-axis voltage and a commanded quadrature-axis voltage;
   and
   a back-electromotive force module configured to determine an adjustment derived from an estimated, observed torque and a commanded torque.

2. The inverter according to claim 1 wherein the first set of equations for estimation of the direct inductance (Ld) and quadrature inductance (Lq) comprise the following:

$$v_d = R_s i_d - L_q i_q \omega_e$$

$$L_q = \frac{R_s i_d - v_d}{i_q \omega_e}$$

$$v_q = R_s i_q + L_d i_d \omega_e + \lambda_f \omega_e$$

$$L_d = \frac{v_q - \lambda_f \omega_e - R_s i_q}{\omega_e i_d}$$

where:
$L_d$ is direct-axis inductance; $L_q$ is quadrature-axis inductance; $v_d$ or $V_d$ is direct-axis voltage; vq or $V_q$ means quadrature-axis voltage; $R_s$ is stator resistance; $i_d$ or $I_d$ is direct-axis current; $i_q$ or $I_q$ is quadrature-axis current; $\lambda_f$ is the back emf constant; and $\omega_e$ is the electrical speed of the rotor.

3. The inverter according to claim 1 wherein upon electrically connecting an electric machine to a controller, the inverter operates based on initial electric machine parameters that are read or retrieved from a data storage device.

4. The inverter according to claim 3 wherein during operation of the electric machine based on the initial electric machine parameters, the inductance estimator of the controller is configured to estimate an estimated direct inductance and an estimated quadrature inductance associated with the electric machine based on a first set of equations that assume a default or initial rotor resistance and a default or initial magnetic flux, or a combination of default or initial back emf constant and number pole pairs.

5. The inverter according to claim 1 wherein the inductance estimation module estimates the estimated direct inductance and estimated quadrature inductance to be consistent with an operational point or region of the maximum torque per amp curve, a field weakening region, or both based on respective commanded direct-axis voltage (or current) and a commanded quadrature-axis voltage (or current).

6. The inverter according to claim 1 wherein the torque estimator is configured to estimate an observed torque measurement associated with a rotor of the electric machine based on measured direct-axis current at the electric machine terminals, measured quadrature-axis current at the electric machine terminals, estimated electrical rotor speed, the respective commanded direct-axis voltage (or current) and a commanded quadrature-axis voltage (or current) that are associated with a commanded torque, where the observed torque measurement is generally proportional to the observed power consumption of the electric machine.

7. The inverter according to claim 1 wherein the controller comprises a proportional integral controller that determines a commanded quadrature-axis current based on a commanded torque.

8. The inverter according to claim 7 wherein the control module further comprises a torque-to-current controller, alone or together with equation-based control module, that estimates the corresponding commanded direct-axis current to the commanded quadrature-axis current: (a) to be consistent with an operational point or operational region of the maximum torque per amp curve and/or a field weakening region based on respective commanded direct-axis voltage (or current) and a commanded quadrature-axis voltage (or current) and (b) based on the estimated direct inductance and estimated quadrature inductance.

9. The inverter according to claim 1 wherein the pulse-width-modulation (PWM) module is configured to provide pulse-width modulated signals to the electric machine based on the commanded direct-axis voltage and a commanded quadrature-axis voltage.

10. The inverter according to claim 1 wherein the back-electromotive force module determines an estimated, observed torque and a commanded torque with respect to the commanded direct-axis voltage and the commanded quadrature-axis voltage that represents the commanded torque to estimate any potential adjustment to the back EMF constant.

11. A method for controlling an electric machine that is coupled to an inverter, the method comprising:
   a switching a low-side switch and a high-side switch of the inverter, the low-side switch and the high-side switching each having a control terminal and two switched terminals;
   providing, by an electronic data processor, control signals to the control terminals of the switching circuit;
   estimating, by the electronic data processor, a direct inductance and quadrature inductance associated with the electric machine based on a first set of equations that assume constant rotor resistance and constant magnetic flux and that are stored in a data storage device;
   estimating an observed torque associated with a rotor of the electric machine based a commanded direct-axis voltage and a commanded quadrature-axis voltage, where the observed torque is proportional to the observed power consumption of the electric machine;
   providing pulse-width modulated signals to the electric machine based on the commanded direct-axis voltage and a commanded quadrature-axis voltage;
   and
   deriving a back-electromotive force adjustment from an estimated, observed torque and a commanded torque.

12. The method according to claim 11 further comprising:
   selecting, by an equation-based controller, an operational point or operational region comprising an MTPA mode or a field-weakening mode; wherein for the MTPA mode, the equation-based control module can select an operational point or operational region that are within the current limit arc and an operational point that is on the MTPA curve and below the maximum quadrature-axis current (Iq) or maximum commanded quadrature-axis current.

13. The method according to claim 11 further comprising:
   selecting, by an equation-based controller, an operational point or operational region comprising an MTPA mode or a field-weakening mode; wherein for the MTPA mode, the equation-based control module can select an operational point or operational region that are within the current limit arc and an operational point that is an operating point that is at intersection of the MTPA curve and associated with one or more targeted torque-speed curves.

14. The method according to claim 11 further comprising:
   selecting, by an equation-based controller, an operational point or operational region in a MTPA mode comprising a first MTPA operational region in direct-quadrature axis current plane that is bounded by a current limit arc, an MTPA curve and an axis of the direct-quadrature axis current plane that is associated with a direct-axis current.

15. The method according to claim 14 further comprising:
   selecting, by an equation-based controller, an operational point or operational region in a second MTPA mode comprising a first MTPA operational region in direct-quadrature axis current plane that is bounded by the current limit arc, the MTPA curve, and the axis of the direct-axis current (or the voltage ellipse curve) and that is associated with one or more targeted torque-speed curves.

16. The method according to claim 11 further comprising:
   selecting, by an equation-based controller, an operational point or operational region in a field weakening mode, the equation-based controller can select any of the following operational points or operational regions that are within the current limit arc and the voltage ellipse that corresponds to the electrical rotational speed of the rotor.

* * * * *